US011831518B2

(12) United States Patent
M. et al.

(10) Patent No.: US 11,831,518 B2
(45) Date of Patent: Nov. 28, 2023

(54) DASHBOARD INTERFACE

(71) Applicant: CERNER INNOVATION, INC., Kansas City, KS (US)

(72) Inventors: Jithu M., Hassan (IN); Priyanka Bandaru, Guntur (IN); Sharaz Khan, Thiruvananthapuram (IN); Akhil Kr, Chalakudy (IN); Ajith Prakash, Bangalore (IN); Prajot Patil, Belgaum (IN); Ravindra Sangamesh Gadad, Hubli (IN); Priya Rai, West Bengal (IN); Asad Iqbal, Jorhat Assam (IN); Sujith Shetty, Mangalore (IN); Dhananjay Gawali, Bangalore (IN); Pravat Santra, Bangalore (IN); John Ulmer, Kansas City, KS (US)

(73) Assignee: CERNER INNOVATION, INC., Kansas City, MO (US)

( * ) Notice: Subject to any disclaimer, the term of this patent is extended or adjusted under 35 U.S.C. 154(b) by 139 days.

(21) Appl. No.: 17/104,492

(22) Filed: Nov. 25, 2020

(65) Prior Publication Data
US 2022/0166684 A1    May 26, 2022

(51) Int. Cl.
| | |
|---|---|
| H04L 29/08 | (2006.01) |
| G06F 9/455 | (2018.01) |
| G06F 9/50 | (2006.01) |
| G06F 9/48 | (2006.01) |
| G06F 8/65 | (2018.01) |
| H04L 29/06 | (2006.01) |
| H04L 41/22 | (2022.01) |
| H04L 67/125 | (2022.01) |

(Continued)

(52) U.S. Cl.
CPC .............. *H04L 41/22* (2013.01); *H04L 41/50* (2013.01); *H04L 67/125* (2013.01); *H04L 67/131* (2022.05); *H04L 67/133* (2022.05); *H04L 67/567* (2022.05)

(58) Field of Classification Search
CPC . H04L 41/22; H04L 43/0876; H04L 41/0896; H04L 41/20; H04L 67/125
See application file for complete search history.

(56) References Cited

U.S. PATENT DOCUMENTS

| | | | |
|---|---|---|---|
| 6,381,587 B1 * | 4/2002 | Guzelsu | G06Q 20/102 705/40 |
| 7,096,459 B2 * | 8/2006 | Keller | G06F 11/0709 717/124 |

(Continued)

*Primary Examiner* — Kevin T Bates
*Assistant Examiner* — Golam Mahmud
(74) *Attorney, Agent, or Firm* — KRAGULJAC LAW GROUP, LLC

(57) ABSTRACT

Technologies are provided for providing a dashboard interface corresponding to one or more datacenter components for information originating from one or more proprietary applications. A selection of information corresponding to the one or more datacenter components is initially received. Upon receiving the selection, an application programming interface (API) call request is made, in real-time, for the information corresponding to the one or more datacenter components from the one or more proprietary applications. As the information corresponding to one or more datacenter components from the one or more proprietary applications is received, it is aggregated and provided within the dashboard interface.

13 Claims, 34 Drawing Sheets

(51) Int. Cl.
    *H04L 41/50*          (2022.01)
    *H04L 67/131*       (2022.01)
    *H04L 67/133*       (2022.01)
    *H04L 67/567*       (2022.01)

(56) References Cited

U.S. PATENT DOCUMENTS

| | | | |
|---|---|---|---|
| 9,077,627 B2 * | 7/2015 | Bonas | H04L 41/0836 |
| 10,645,122 B2 * | 5/2020 | Purusothaman | H04L 63/0263 |
| 10,748,161 B1 * | 8/2020 | Norbeck, Jr. | G06F 8/60 |
| 2004/0083119 A1 * | 4/2004 | Schunder | G06Q 10/10 |
| | | | 705/7.31 |
| 2007/0192763 A1 * | 8/2007 | Helvick | G06F 8/65 |
| | | | 717/168 |
| 2011/0126197 A1 * | 5/2011 | Larsen | G06F 9/45533 |
| | | | 718/1 |
| 2013/0013738 A1 * | 1/2013 | Astete | G06F 21/6218 |
| | | | 709/217 |
| 2015/0120359 A1 * | 4/2015 | Dongieux | G06F 16/285 |
| | | | 705/7.15 |
| 2016/0094483 A1 * | 3/2016 | Johnston | G06F 8/65 |
| | | | 709/226 |
| 2017/0201425 A1 * | 7/2017 | Marinelli | H04L 41/12 |
| 2018/0136960 A1 * | 5/2018 | Zhang | G06F 8/65 |
| 2018/0262391 A1 * | 9/2018 | Jung | H04L 67/02 |
| 2018/0299846 A1 * | 10/2018 | Ray | G06Q 10/04 |
| 2019/0102071 A1 * | 4/2019 | Redkina | G06F 16/30 |
| 2019/0123985 A1 * | 4/2019 | Rao | H04L 41/14 |
| 2019/0340564 A1 * | 11/2019 | Holmquist | H04L 43/065 |
| 2020/0204468 A1 * | 6/2020 | Nickolov | H04L 43/0817 |
| 2020/0311619 A1 * | 10/2020 | Ramirez Flores | G06Q 10/02 |
| 2020/0410430 A1 * | 12/2020 | Santra | G06Q 10/06315 |
| 2021/0149658 A1 * | 5/2021 | Cannon | G06N 3/04 |
| 2022/0103592 A1 * | 3/2022 | Semel | H04L 63/20 |

\* cited by examiner

IMPORT FIREWALL DATA

Choose File  No file chosen

Updated On  ▼
Delete

Import

☐ HOME  ☐ DC ▼  ☐ WAN & VPN ▼  ☐ GATEWAY ▼  ☐ EOL ▼  ☐ VULNERABILITY ▼  ☐ DEVICE CONFIG BACKUPS ▼  ☐ UTILIZATION ▼  ☐ CASE TRACKING ▼  ☐ PORTS ▼  ☐ REPORTS ▼

☐ Smith, John

● All  ○ Physical  ○ Virtual  ○ WAN
○ DC  ○ DR  ○ LAB

Last Updated at Wednesday 2nd of September 2020 09:00:03 AM.

Search:

| # | Reachability | Device Name | IP | DNS | Device Type | Last Successful Collection Time | Software Version | Updated On |
|---|---|---|---|---|---|---|---|---|
| 1 | Reachable | DEVICE01 | 123.456.7.89 | 123.456.7.89 | Cisco ASA 5540 Adaptive Security Appliance Security Context | 988 days 20 hrs 47 mins 20 secs | 8.2(5)46 | 2020-09-02 09:00:03 |
| 2 | Reachable | DEVICE02 | 123.456.7.90 | 123.456.7.90 | Cisco ASA 5555-X Adaptive Security Appliance | 1,311 days 3 hrs 58 mins 28 secs | 9.1(6) | 2020-09-02 09:00:03 |
| 3 | Reachable | DEVICE03 | 123.456.7.91 | 123.456.7.91 | Cisco ASA 5555-X Adaptive Security Appliance | 1,348 days 1 hrs 47 mins 18 secs | 9.1(5) | 2020-09-02 09:00:03 |
| 4 | Reachable | DEVICE04 | 123.456.7.92 | 123.456.7.92 | Cisco ASA 5555-X Adaptive Security Appliance | 1,348 days 0 hrs 47 mins 55 secs | 9.1(5) | 2020-09-02 09:00:03 |
| 5 | Reachable | DEVICE05 | 123.456.7.93 | 123.456.7.93 | Cisco ASA 5555-X Adaptive Security Appliance | 1,198 days 1 hrs 54 mins 54 secs | 9.1(6) | 2020-09-02 09:00:03 |
| 6 | Unknown Value (5) | DEVICE06 | 123.456.7.94 | 123.456.7.94 | Cisco ASA 5555-X Adaptive Security Appliance | 1,324 days 2 hrs 58 mins 4 secs | 9.4(2)11 | 2020-09-02 09:00:03 |
| 7 | Reachable | DEVICE07 | 123.456.7.95 | 123.456.7.95 | Cisco ASA 5555-X Adaptive Security Appliance | 1,311 days 4 hrs 58 mins 41 secs | 9.1(6) | 2020-09-02 09:00:03 |
| 8 | Reachable | DEVICE08 | 123.456.7.96 | 123.456.7.96 | Cisco ASA 5555-X Adaptive Security Appliance | 1,153 days 2 hrs 52 mins 20 secs | 9.1(6)11 | 2020-09-02 09:00:03 |
| 9 | Reachable | DEVICE09 | 123.456.7.97 | 123.456.7.97 | Cisco ASA 5555-X Adaptive Security Appliance | 1,153 days 18 hrs 52 mins 19 secs | 9.2(3) | 2020-09-02 09:00:03 |
| 10 | Reachable | DEVICE10 | 123.456.7.98 | 123.456.7.98 | Cisco ASA 5555-X Adaptive Security Appliance | 992 days 3 hrs 47 mins 39 secs | 9.2(3) | 2020-09-02 09:00:03 |

| | | | | | | | Smith, John |
|---|---|---|---|---|---|---|---|
| ☐ HOME | ☐ DC ⌄ | ☐ WAN & VPN ⌄ | ☐ GATEWAY ⌄ | ☐ EOL ⌄ | ☐ VULNERABILITY ⌄ | ☐ DEVICE CONFIG BACKUPS ⌄ | ☐ UTILIZATION ⌄ ☐ CASE TRACKING ⌄ ☐ PORTS ⌄ ☐ REPORTS ⌄ |

IMPORT EOL HARDWARE DATA

Choose File | No file chosen | Updated On ⌄
Import | Delete

○ All
● EOL yes  ○ EOL no

Last Updated by JSmith at 2020-09-01 09:17:10.

10 ⌄ records

Search: [        ]

| Device Name | Product Type | IP Address | Model Name | End of Support | End of Sale | End of Life | End of Engineering | End of |
|---|---|---|---|---|---|---|---|---|
| DEVICE01 | Cisco 3750 Stackable Switches | 123.456.7.89 | WS-C3750X-48T-S | Oct 31, 2021 | Oct 30, 2016 | Yes - http://www.cisco.com/c/en/us/products/collateral/switches/catalyst-3560-x-series-switches/eos-eol-notice-c51-736139.html | Oct 30, 2018 | Jan 28, |
| DEVICE02 | Cisco ASA-5540 Adaptive Security Appliance Security Context | 123.456.7.90 | CISCOASA5540sc | Sep 30, 2018 | Sep 16, 2013 | Yes - http://www.cisco.com/en/us/prod/collateral/vpndevc/ps6032/ps6094/ps6120/eol_C51-727354.html | Sep 16, 2015 | Dec 12, |
| DEVICE03 | Cisco ASA-5550 Adaptive Security Appliance Security Context | 123.456.7.91 | GenericDevice | Sep 30, 2018 | Sep 16, 2013 | Yes - http://www.cisco.com/en/us/prod/collateral/vpndevc/ps6032/ps6094/ps6120/eol_C51-727352.html | Sep 16, 2015 | Dec 12, |
| DEVICE04 | Cisco ASA-5550 Adaptive Security Appliance Security Context | 123.456.7.92 | GenericDevice | Sep 30, 2018 | Sep 16, 2013 | Yes - http://www.cisco.com/en/us/prod/collateral/vpndevc/ps6032/ps6094/ps6120/eol_C51-727352.html | Sep 16, 2015 | Dec 12, |
| DEVICE05 | Cisco ASA-5550 Adaptive Security Appliance Security Context | 123.456.7.93 | GenericDevice | Sep 30, 2018 | Sep 16, 2013 | Yes - http://www.cisco.com/en/us/prod/collateral/vpndevc/ps6032/ps6094/ps6120/eol_C51-727352.html | Sep 16, 2015 | Dec 12, |

| ☐ HOME | ☐ DC ˅ | ☐ WAN & VPN ˅ | ☐ GATEWAY ˅ | ☐ EOL ˅ | ☐ VULNERABILITY ˅ | ☐ DEVICE CONFIG BACKUPS ˅ | ☐ UTILIZATION ˅ | ☐ CASE TRACKING ˅ | ☐ PORTS ˅ | ☐ REPORTS ˅ |

IMPORT VULNERABILITY DATA

Choose File | No file chosen          Updated On [         ˅]          Last Updated by JSmith at 2020-09-01 09:16:07.
Import                                 Delete
                                       ● All
                                       ○ Vulnerable Based On Config
                                       ○ Vulnerable Based On Version

[10 ˅] records                                                                                                   Search: [Cisco Catalyst 2950C 24]

| Device Name | Product Type | IP Address | OS Type | OS Version | PSIRT Title | Based on Config | Based on Version | Updated On |
|---|---|---|---|---|---|---|---|---|
| DEVICE01 | Cisco Catalyst 2950C 24 Switch | 123.456.7.89 | IOS | 12.1(20)EA1a | Crafted IP Option Vulnerability (http://tools.cisco.com/security/center/content/CiscoSecurityAdvisory/cisco-sa-20070124-crafted-ip-option) | Not Vulnerability | Vulnerable | 2020-09-01 09:16:07 |
| DEVICE02 | Cisco Catalyst 2950C 24 Switch | 123.456.7.90 | IOS | 12.1(20)EA1a | Crafted TCP Packet Can Cause Denial of Service(http://tools.cisco.com/security/center/content/CiscoSecurityAdvisory/cisco-sa-20070124-crafted-tcp) | Not Vulnerability | Vulnerable | 2020-09-01 09:16:07 |
| DEVICE03 | Cisco Catalyst 2950C 24 Switch | 123.456.7.91 | IOS | 12.1(20)EA1a | Crafted Telnet Denial of Service Vulnerability(http://tools.cisco.com/security/center/content/CiscoSecurityAdvisory/cisco-sa-20040827-telnet) | Not Vulnerability | Vulnerable | 2020-09-01 09:16:07 |
| DEVICE04 | Cisco Catalyst 2950C 24 Switch | 123.456.7.92 | IOS | 12.1(20)EA1a | TCP State Manipulation Denial of Service Vulnerabilities in Multiple Cisco Products - IOS & IOS-XE(http://tools.cisco.com/security/center/content/CiscoSecurityAdvisory/cisco-sa-20090908-tcp24) | Not Vulnerability | Vulnerable | 2020-09-01 09:16:07 |
| DEVICE05 | Cisco Catalyst 2950C 24 Switch | 123.456.7.93 | IOS | 12.1(20)EA1a | Cisco IOS Software TCP Packet Memory Leak Vulnerability (CVE-2015-0646) (http://tools.cisco.com/security/center/content/CiscoSecurityAdvisory/cisco-sa-20150325-tcpleak) | Not Vulnerability | Vulnerable | 2020-09-01 09:16:07 |

☐ Smith, John

| HOME | □ HOST DETAILS | □ HOST TO STORAGE | □ STORAGE OS VERSION | □ CONTRACT STATUS ▾ | □ CAPACITY ▾ | □ REPORTS | | □ Smith, John |

IMPORT STORAGE ARRAY CAPACITY

Last Updated at Wednesday 2nd of September 2020 12:30:15 PM.

Choose File  No file chosen    Updated On ▾    Select Filter ▾

Import    Delete

10 ▾ records    Search: STORAGE01

| Datacenter ⇕ | Tier Name ⇕ | Storage Name ⇕ | Manufacturer ⇕ | Family ⇕ | Model ⇕ | Lifecycle ⇕ | Environment ⇕ | Raw Capacit (TB) ⇕ | Capacity (TB) ⇕ | Used Capacity (TB) ⇕ | Unused Capacity (TB) ⇕ | % |
|---|---|---|---|---|---|---|---|---|---|---|---|---|
| 35VS | Tier 4db | STORAGE01 | EMC | Isilon | NL400-4U-Dual-24GB-2x1GE-2x10GE SFP+-108TB, X400-4U-Dual48GB-2x1GE-2x10GE SFP+-34TB-800GB SSD | Production | N/A | 780 | 771 | 562 | 209 | 72 |

◂ 1 ▸

Showing 1 to 1 of 1 entries (filtered from 76 total entries)

☐ HOME | ☐ DC ˅ | ☐ WAN & VPN ˅ | ☐ GATEWAY ˅ | ☐ EOL ˅ | ☐ VULNERABILITY ˅ | ☐ DEVICE CONFIG BACKUPS ˅ | ☐ UTILIZATION ˅ | ☐ CASE TRACKING ˅ | ☐ PORTS ˅ | ☐ REPORTS ˅     ☐ Smith, John

IMPORT PORT CAPACITY DATA

Choose File | No file chosen          Updated On ˅       ASP ˅
Import                                Delete             9K ˅

Last Updated by JSmith at 2020-09-01 11:38:30.

10 ˅ records                                                                                                                                    Search:

| # | device_name | device_ip | model | 40_Gig_used_ports | 40_Gig_free_ports | 40_Gig_total_ports | 10_Gig_used_ports | 10_Gig_free_ports | 10_Gig_total_ports | 1_Gig_used_port | 1_Gig_free_port |
|---|---|---|---|---|---|---|---|---|---|---|---|
| 7 | DEVICE01 | 123.456.7.89 | Cisco Nexus 9372PX Switch | 4 | 2 | 6 | 45 | 3 | 48 | 0 | 0 |
| 8 | DEVICE02 | 123.456.7.90 | Cisco Nexus 9372PX Switch | 4 | 2 | 6 | 25 | 23 | 48 | 0 | 0 |
| 9 | DEVICE03 | 123.456.7.91 | Cisco Nexus 9372PX Switch | 3 | 3 | 6 | 25 | 23 | 48 | 0 | 0 |
| 10 | DEVICE04 | 123.456.7.92 | Cisco Nexus 9372PX-E Switch | 4 | 2 | 6 | 36 | 12 | 48 | 0 | 0 |

CLIENT01

*Hey there!! Search by any keyword or an asset name.*

2820

ASSET INFORMATION

Export ▾

| Host Name | IP Address | Operating System | Server Type | Storage Arrays | Client Name | Managed By | Fabric Switch Name | Fabric Port Name | Network |
|---|---|---|---|---|---|---|---|---|---|
| HOST01 | 123.456.7.89 | Windows | Physical Server | Sym-000197800669 | CLIENT01 | WRTN_WV_PROD_CWx_HS | ASP_DCX_SW09 | | |
| HOST02 | 123.456.7.90 | Windows | Physical Server | Sym-000197800669 | CLIENT01 | WRTN_WV_PROD_CWx_HS | ASP_DCX_SW09 | | |
| HOST03 | 123.456.7.91 | Windows | Virtual Server | HP3Par_2YHV | CLIENT01 | WRTN_WV_PROD_CWx_HS | NA | | |
| HOST04 | 123.456.7.92 | Windows | Physical Server | Sym-000197800669 | CLIENT01 | WRTN_WV_PROD_CWx_HS | ASP_DCX_SW09 | | |

10 ▾ records

| # | Action | Change id | Group name | Schedule start | Schedule end | Summary | Status | Coordinator group | Impact | Coordinator Name |
|---|---|---|---|---|---|---|---|---|---|---|
| 1 | | CRQ000003418210 | Storage & Backup | 2020-09-01 05:03:16 | 2020-09-08 05:02:16 | ClosedStack Deconfigure Backups | Completed | Infra_Del_Malvern_Backup_CTS | 4-Minor/Localized | Nishan Rao |
| 2 | | CRQ000003418211 | Storage & Backup | 2020-09-01 05:04:34 | 2020-09-08 05:03:34 | ClosedStack Deconfigure Backups | Completed | Infra_Del_Malvern_Backup_CTS | 4-Minor/Localized | Nishan Rao |
| 3 | | CRQ000003418653 | Storage & Backup | 2020-09-01 05:05:24 | 2020-09-08 05:04:24 | ClosedStack Deconfigure Backups | Completed | Infra_Del_Malvern_Backup_CTS | 4-Minor/Localized | Nishan Rao |
| 4 | | CRQ000003404569 | Storage & Backup | 2020-09-02 04:27:20 | 2020-09-02 14:27:21 | Storage Reclaim - CERN_PA- Cerner Health Services - Windows Server 2012 R2 | Completed | Infra_Del_Malvern_SAN_Storage_CTS | 4-Minor/Localized | Nitin Sansania |
| 5 | | CRQ000003370257 | Storage & Backup | 2020-09-03 02:00:00 | 2020-09-03 03:30:00 | Storage Migration - HRHS_PA-Holy Redeemer | Planning in Progress | Infra_Del_Malvern_SAN_Storage_CTS | 4-Minor/Localized | Praveen Kakani |

Monthly Data -- Storage & Backup (September 2020)

FIG. 29

ASSET INFORMATION

DEVICE01

DEVICE02/DEVICE01

Export ▾

10 ▾ records

| Host Name | IP Address | Operating System | Server Type | Storage Arrays | Client Name | Managed By |
|---|---|---|---|---|---|---|
| HOST01 | 123.456.7.89 | Oracle Linux | Physical Server | NA | NA | Infra_Del_Malvern_UNIX_C |
| HOST02 | 123.456.7.90 | Oracle Linux | Physical Server | Sym-000197800974 | NA | WebSphere_Tech_Infra_CWS |
| HOST03 | 123.456.7.91 | Windows | Physical Server | Sym-000197800590 | CLIENT01 | Infra_Del_Malvern_FE_SharedS |
| HOST04 | 123.456.7.92 | Windows | Physical Server | Sym-000197800974 | CLIENT02 | NextGen_Systems_CWx |
| HOST05 | 123.456.7.93 | Windows | Physical Server | Sym-000197800590 | CLIENT03 | NextGen_Systems_CWx |

| ☐ CASE TRACKING | ☐ PORTS | ☐ REPORTS | | | | | | ☐ Smith, John |
|---|---|---|---|---|---|---|---|---|

IMPORT EOL SOFTWARE DATA

Choose File | No file chosen     Updated On ▼         ● All           Last Updated by JSmith
Import                            Delete                ○ EOL yes      at 2020-09-01 09:17:58.
                                                        ○ EOL no 10 ▼ records                                                                          Search: DEVICE01

| Device Name ◆ | Product Type ◆ | IP Address ◆ | OS Type ◆ | OS Version ◆ | End Of Support ◆ | End Of Sale ◆ | End of Life |
|---|---|---|---|---|---|---|---|
| DEVICE01 | Cisco Nexus 5548UP Switch | 123.456.7.89 | NXOS | 5.2(1)N1(9a) | May 31, 2020 | May 08, 2015 | Yes - http://www.cisco.com/c/en/us/products/collateral/switches/nexus-5000-series-switches/eos-eol-notice-c51-733330.html |

Showing 1 to 1 of 1 entries (filtered from 207 total entries)      ‹ 1 ›

DASHBOARD INTERFACE

BACKGROUND

The growing complexity of large infrastructures, such as datacenters, frequently hinders the understanding of the system behavior. While datacenters have a wide range of sizes from hundreds to thousands of components, it is common for system administrators to utilize many different management tools to monitor various aspects of the datacenter, such as individual components of a particular system, relationships between components of the particular system, as well as the overall particular system itself.

Because of the need to utilize the many different management tools, it is neither practical nor possible to access each tool necessary to collate crucial data and inform decision making. Moreover, the different management tools utilize multiple data sources, each storing different data variables, often in proprietary formats, creating bottlenecks in the workflow. In many cases, this causes delays in both proactive and reactive engagement. Dependencies on other organizations or business units to provide necessary information cause even further delays. An inability to efficiently and effectively resolve vulnerabilities, compliance issues, end of life and end of service life issues results.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing a dashboard interface. More particularly, embodiments of the present invention provide, within the dashboard interface, aggregated information corresponding to one or more datacenter components originating from one or more proprietary applications. To do so, a selection of information corresponding to one or more datacenter components is initially received. Upon receiving the selection, an application programming interface (API) call request is made, in real-time, for the information corresponding to the one or more datacenter components from the one or more proprietary applications. As the information corresponding to one or more datacenter components from the one or more proprietary applications is received, it is aggregated and provided within the dashboard interface.

BRIEF DESCRIPTION OF THE DRAWINGS

The present invention is described in detail below with reference to the attached drawing figures, wherein:

FIGS. 4-33 depict illustrative screen displays, in accordance with embodiments of the present disclosure;

DETAILED DESCRIPTION

Figure 1:
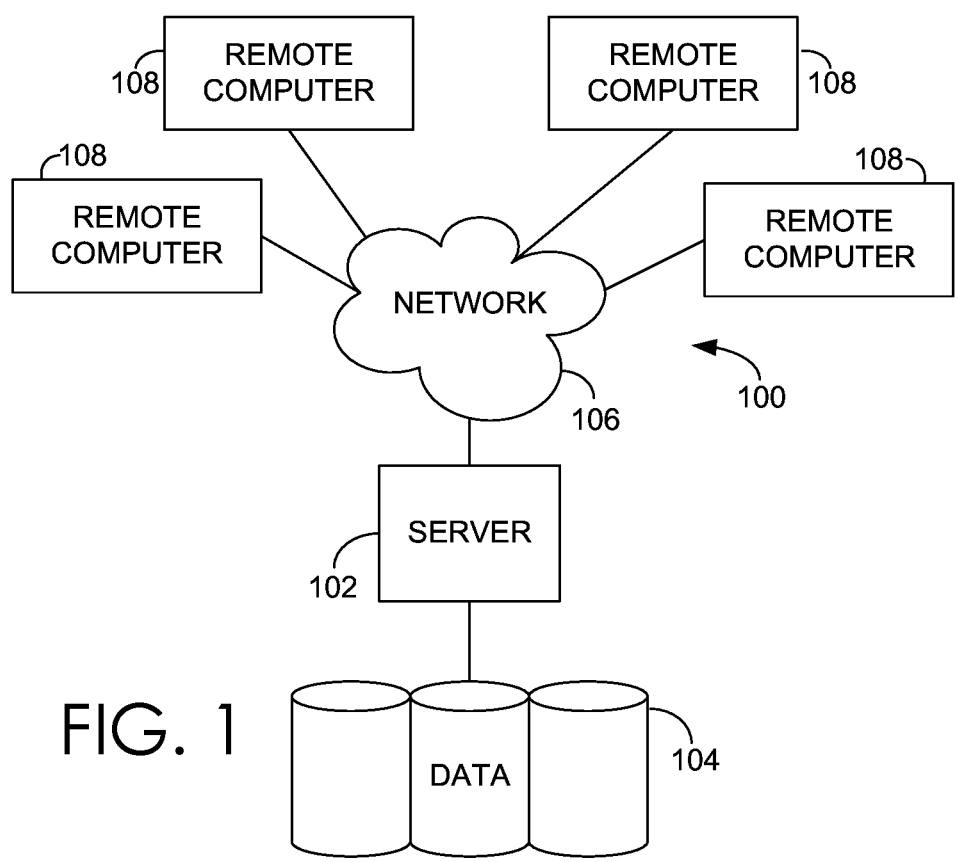
FIG. 1 is a block diagram of an exemplary computing environment suitable for use in implementing the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As noted in the Background, conventional systems require the need to utilize many different management tools, making them neither practical nor possible to access each tool necessary to collate crucial data and inform decision making. Moreover, the different management tools utilize multiple data sources, each storing different data variables, often in proprietary formats, creating bottlenecks in the workflow. In many cases, this causes delays in both proactive and reactive engagement. Dependencies on other organizations or business units to provide necessary information cause even further delays. An inability to efficiently and effectively resolve vulnerabilities, compliance issues, end of life and end of service life issues results.

Embodiments of the present invention relate to providing a dashboard interface of aggregated information corresponding to one or more datacenter components originating from one or more proprietary applications. To do so, a selection of information corresponding to one or more datacenter components is initially received. The information may comprise one or more of: asset information, storage information, network information, virtualization information, systems information, capacity planning information, and change and incident management information. Upon receiving the selection, an application programming interface (API) call request is made, in real-time, for the information corresponding to the one or more datacenter components from the one or more proprietary applications. As the information corresponding to one or more datacenter components from the one or more proprietary applications is received, it is aggregated and provided within the dashboard interface. In this way, a single pane of glass (i.e., the dashboard interface) can provide a complete datacenter overview for items such as storage capacity, fabric capacity, compute capacity, network port capacity, data trends, infrastructure vulnerabilities, firmware version, patching compliance, end of life and end of service life status, host details, tier reports, utilization status, backup status, and inventory overview, each of which normally includes navigating one or more proprietary applications to provide similar information. Embodiments of the present invention obviate the need to navigate multiple applications and instead provide the information within a single interface.

In embodiments, each of the one or more proprietary applications are provided by different entities and store data in different formats. The API call that requests the information may comprise translating the selection of information into proprietary business logic corresponding to a proprietary application of the one or more proprietary applications. As the information is aggregated, the received information may be translated back into business logic corresponding to the dashboard interface.

In some embodiments, a change calendar is provided within the dashboard interface. The change calendar comprises one or more links to a proprietary application of the one or more proprietary applications for additional information. In some embodiments a unified central repository is provided within the dashboard interface. The unified central repository may provide capacity information across all infrastructure verticals for the one or more datacenter components. Additionally or alternatively, the unified central repository may provide a detailed inventory for the one or more datacenter components. Additionally or alternatively, the unified central repository may provide environment-wise and vendor-wise data for the one or more datacenter components.

In some embodiments, the unified central repository enables tracking of vendor contracts for the one or more datacenter components. End of life and end of service life devices may be identified for the one or more datacenter components. Clients affected by the devices may be identified. Upgrade activity for the devices of the one or more datacenter components may be automatically scheduled based on downtime preferences of the identified clients.

Accordingly, in one aspect, an embodiment of the present invention is directed to a computerized method. The method includes receiving, via a dashboard interface provided at a user device, a selection of information corresponding to one or more datacenter components. The method also includes, upon receiving the selection, causing an application programming interface (API) call to request, in real-time, the information corresponding to one or more datacenter components from one or more proprietary applications. The method further includes receiving, the information corresponding to one or more datacenter components from the one or more proprietary applications. The method also includes aggregating the information corresponding to one or more datacenter components from the one or more proprietary applications. The method further includes providing, within the dashboard interface, the aggregated information corresponding to one or more datacenter components from the one or more proprietary applications.

In another aspect of the invention, an embodiment is directed to one or more computer storage media having computer-executable instructions embodied thereon that, when executed by a computer, causes the computer to perform operations. The operations include receiving, via a dashboard interface provided at a user device, a selection of information corresponding to one or more datacenter components. The information comprises one or more of: asset information, storage information, network information, virtualization information, systems information, capacity planning information, and change and incident management information. The operations also include, upon receiving the selection, causing an application programming interface (API) call to request, in real-time, the information corresponding to one or more datacenter components from one or more proprietary applications. Each of the one or more proprietary applications are provided by different entities and store data in different formats. The operations further include receiving, the information corresponding to one or more datacenter components from the one or more proprietary applications. The operations also include aggregating the information corresponding to one or more datacenter components from the one or more proprietary applications. The operations further include providing the information, within the dashboard interface, the aggregated information corresponding to one or more datacenter components from the one or more proprietary applications.

In a further aspect, an embodiment is directed to a computerized system that includes one or more processors and a non-transitory computer storage medium storing computer-useable instructions that, when used by the one or more processors, cause the one or more processors to: receive, via a dashboard interface provided at a user device, a selection of information corresponding to one or more datacenter components; upon receiving the selection, cause an application programming interface (API) call to request, in real-time, the information corresponding to one or more datacenter components from one or more proprietary applications; receive, the information corresponding to one or more datacenter components from the one or more proprietary applications; aggregate the information corresponding to one or more datacenter components from the one or more proprietary applications; and provide the information, within the dashboard interface, the aggregated information corresponding to one or more datacenter components from the one or more proprietary applications.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention might be operational with numerous other purpose computing system environments or configurations. Examples of well-known computing systems, environments, and/or configurations that might be suitable for use with the present invention include personal computers, server computers, hand-held or laptop devices, multi-processor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, ambulatory settings, medical billing and financial offices, hospital administration settings, home healthcare environments, clinicians' offices, Center for Disease Control, Centers for Medicare & Medicaid Services, World Health Organization, any governing body either foreign or domestic, Health Information Exchange, and any healthcare/government regulatory bodies not otherwise mentioned. Clinicians may comprise a treating physician or physicians; specialists such as intensivists, surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; students; and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
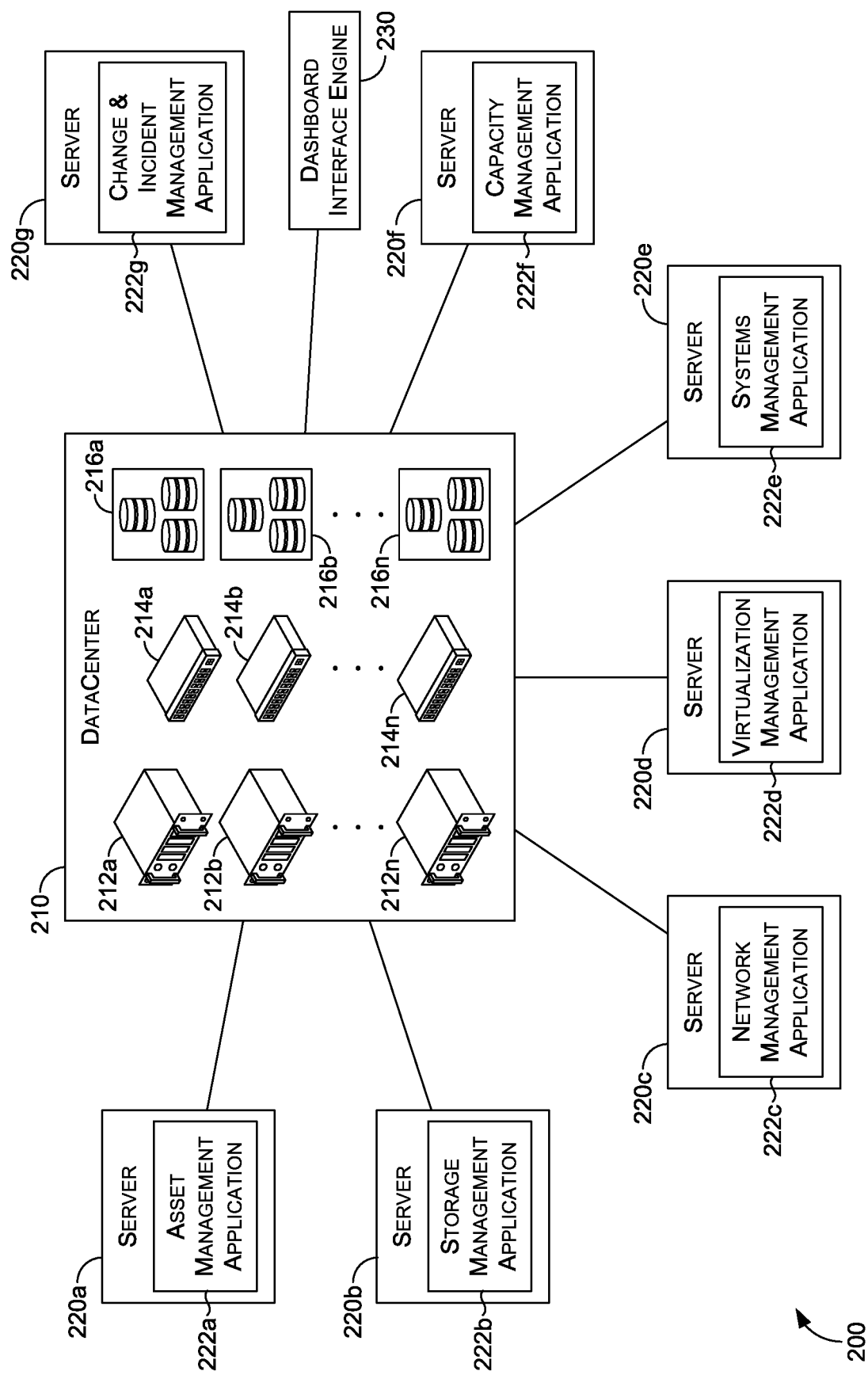
FIG. 2 is a block diagram of an exemplary system for providing a dashboard interface, in accordance with an embodiment of the present disclosure.

Turning now to FIG. 2, an exemplary dashboard interface system 200 is depicted suitable for use in implementing embodiments of the present invention. The dashboard interface system 200 is merely an example of one suitable computing system environment and is not intended to suggest any limitation as to the scope of use or functionality of embodiments of the present invention. Neither should the dashboard interface system 200 be interpreted as having any dependency or requirement related to any single module/component or combination of modules/components illustrated therein.

The dashboard interface system 200 includes datacenter 210, servers 220a-220g, and dashboard interface engine 230, all in communication with one another via a network. The network may include, without limitation, one or more secure local area networks (LANs) or wide area networks (WANs). The network may be a secure network associated with a facility such as a healthcare facility. The secure network may require that a user log in and be authenticated in order to send and/or receive information over the network.

The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, dashboard interface engine 230 might reside on a server, cluster of servers, or a computing device remote from one or more of the remaining components. Although illustrated as separate systems, the functionality provided by each of these components might be provided as a single component/module. The single unit depictions are meant for clarity, not to limit the scope of embodiments in any form.

Components of the dashboard interface system 200 may include a processing unit, internal system memory, and a suitable system bus for coupling various system components, including one or more data stores for storing information (e.g., files and metadata associated therewith). Components of the dashboard interface system 200 typically includes, or has access to, a variety of computer-readable media.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Servers 220a-220g includes or has access to infrastructure that is capable of receiving and communicating information for use by, for example, dashboard interface engine 230. The information received and communicated in association with servers 220a-220g may comprise general information used by dashboard interface engine 210. Servers 220a-220g may receive data from datacenter 210 or components of datacenter, which may include any number or type of devices that may be utilized to provide or support the datacenter infrastructure. Datacenter infrastructure may include servers 212a-212n, switches 214a-214n, storage devices 216a-216n, among other components. Additionally, datacenter infrastructure may include various applications, systems, operating systems, and the like.

Servers 220a-220g may comprise various proprietary applications used to monitor, manage, or support various aspects of datacenter 210 or components of datacenter 212a-212n, 214a-214n, 216a-216n. For example, servers 220a-220g may comprise asset management application 222a, storage management application 222b, network management application 222c, virtualization management application 222d, systems management application 222e, capacity management application 222f, and/or change and incident management application 222g. Examples of such applications include BMC HELIX DISCOVERY, REMEDY, BROCADE NETWORK ADVISOR, SOLARWINDS DATABASE PERFORMANCE ANALYZER, CISCO PRIME, NETSCOUT, RIVERBED, CITRIX APPLICATION DELIVERY MANAGEMENT, VMWARE VREALIZE OPERATIONS, VMWARE VREALIZE AUTOMATION, VMWARE VCENTER, MICROSOFT SYSTEM CENTER CONFIGURATION MANAGER, MICROSOFT SYSTEM CENTER OPERATIONS MANAGER, STORIX, SPACEWALK, and the like.

Generally, the dashboard interface engine 230 is configured to provide a dashboard interface of aggregated information corresponding to one or more datacenter components 212a-212n, 214a-214n, 216a-216n originating from one or more proprietary applications such as asset management application 222a, storage management application 222b, network management application 222c, virtualization management application 222d, systems management application 222e, capacity management application 222f, and/or change and incident management application 222g. The dashboard interface engine 230 initially receives a selection of information corresponding to one or more datacenter components. Upon receiving the selection, an application programming interface (API) call request is made, in real-time, for the information corresponding to the one or more datacenter components from the one or more proprietary applications. As the information corresponding to one or more datacenter components from the one or more proprietary applications is received, it is aggregated and provided within the dashboard interface.

Figure 3:
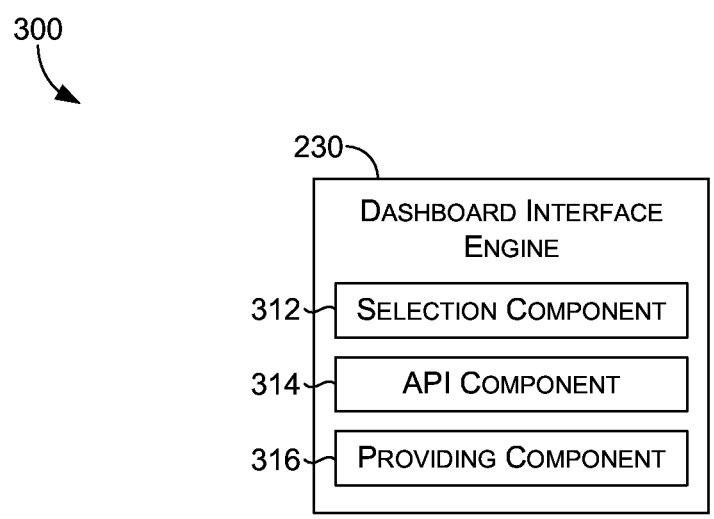
FIG. 3 is a block diagram of an exemplary implementation of a dashboard interface engine, in accordance with some embodiments of the present disclosure.

Referring now to FIG. 3, the dashboard interface engine 230 includes several components. For example, the dashboard interface engine 230 may include selection component 312, API component 314, and providing component 316. Initially, selection component 312 generally facilitates selection of various information corresponding to one or more datacenter components. For example, selection component 312 provides a home page for the dashboard interface. From the home page a user may select various information corresponding to the datacenter. In various embodiments, the user may select asset, storage, network, virtualization, or computer information. In some embodiments, the user may select information such as a change calendar, network infrastructure inventory, server inventory, switch port capacity, storage capacity, storage array capacity, network components vulnerabilities, end of life, and the like.

Upon receiving the selection, API component 314 requests, in real-time, the selected information from one or more proprietary applications. As described above, the one or more proprietary applications may include asset management application 222a, storage management application 222b, network management application 222c, virtualization management application 222d, systems management application 222e, capacity management application 222f, and/or change and incident management application 222g.

Providing component 316 receives and aggregates the information from the one or more proprietary applications. The aggregated information corresponding to the one or more datacenter components from the one or more proprietary applications is provided, by providing component 316, with the dashboard interface. In some embodiments, providing component 316 provides a change calendar that comprises one or more links to a proprietary application of the one or more proprietary applications for additional information. In some embodiments, providing component 316 provides a unified central repository that provides capacity information across all infrastructure verticals for the one or more datacenter components. In some embodiments, providing component 316 provides a unified central repository that provides a detailed inventory for the one or more datacenter components.

With reference to FIGS. 4-34, illustrative screen displays of embodiments of the present invention are shown. It is understood that each of the illustrative screen displays are connected logically, such that they comprise a dashboard interface of aggregated information corresponding to one or more datacenter components. The screen displays may appear in any order and with any number of screen displays, without regard to whether the screen display is described or depicted herein. The screen displays provide tools that facilitates selection of various information corresponding to one or more datacenter components, in accordance with embodiments of the present invention.

Figure 4:
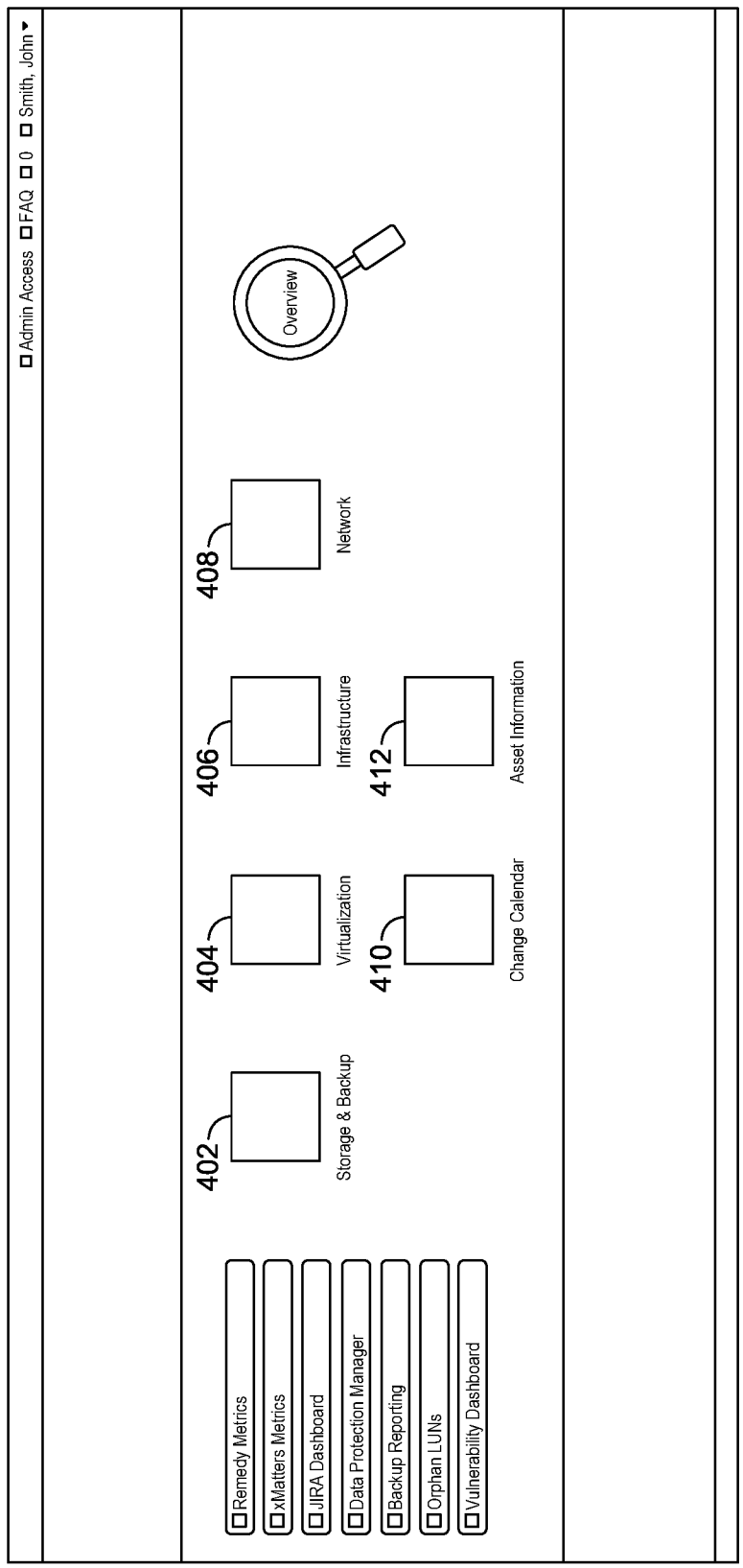

As shown in FIG. 4, a home page 400 for the dashboard interface is provided. The home page 400 provides a variety of tools that enable a user to select various information corresponding to one or more datacenter components. For example, a storage and backup tool 402 enables the user to select information corresponding to storage and backup information for the datacenter environment. A virtualization tool 404 enables the user to select information corresponding to virtualization information for the datacenter environment. An infrastructure tool 406 enables the user to select information corresponding to infrastructure for the datacenter environment. A network 408 tool enables the user to select information corresponding to network information for the datacenter environment. A change calendar 410 enables the user to select information corresponding to a change calendar for the datacenter environment. An asset information 412 enables the user to select information corresponding to assets of the datacenter environment.

Figure 5:
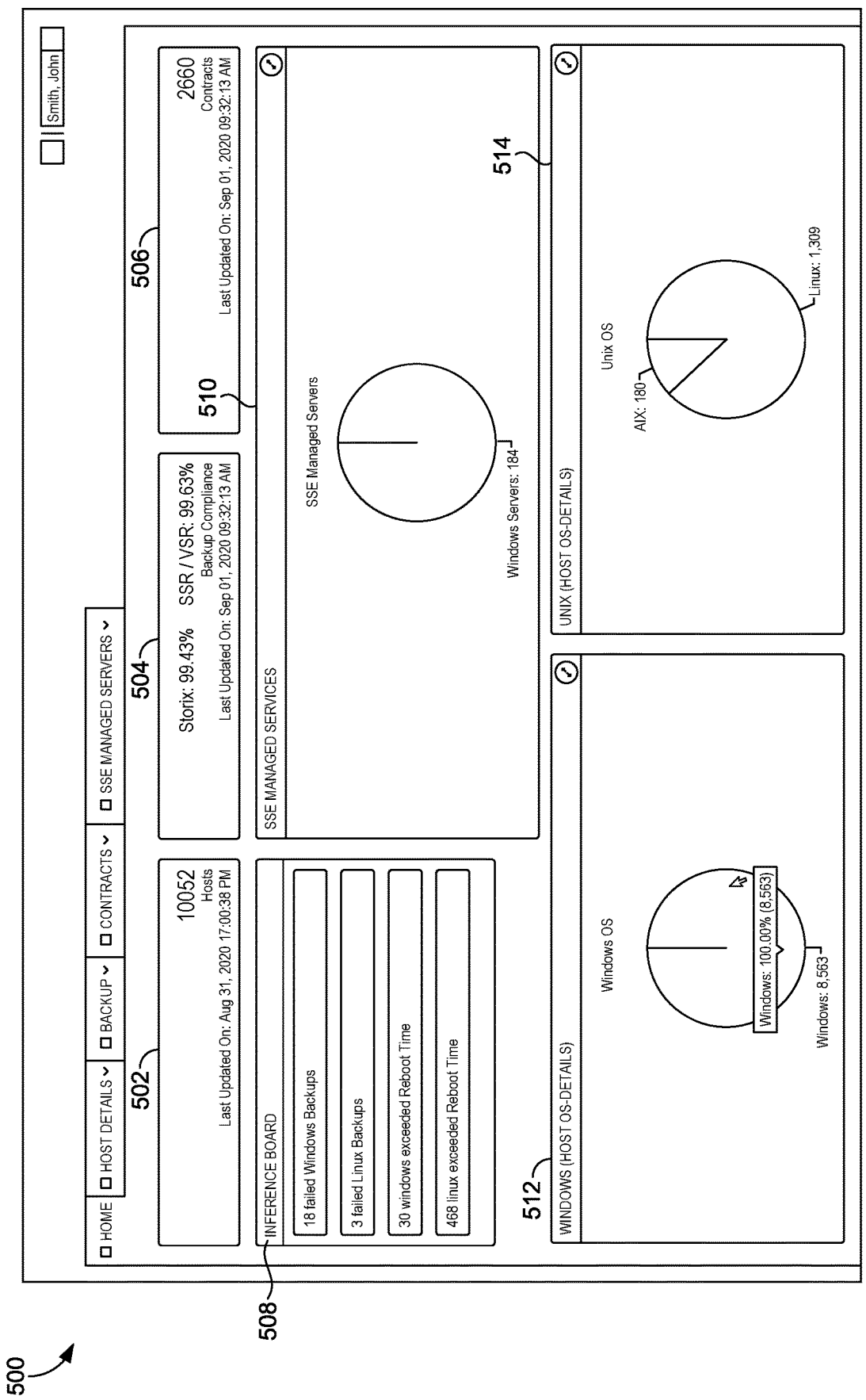

Turning now to FIG. 5, a server infrastructure interface 500 provides details of the server infrastructure for the datacenter. For example, the server infrastructure interface 500 provides details corresponding to hosts information 502, backup compliance 504, contracts 506, an inference board 508, SSE managed services 510, Windows hosts 512, and UNIX hosts 514.

Figure 6:
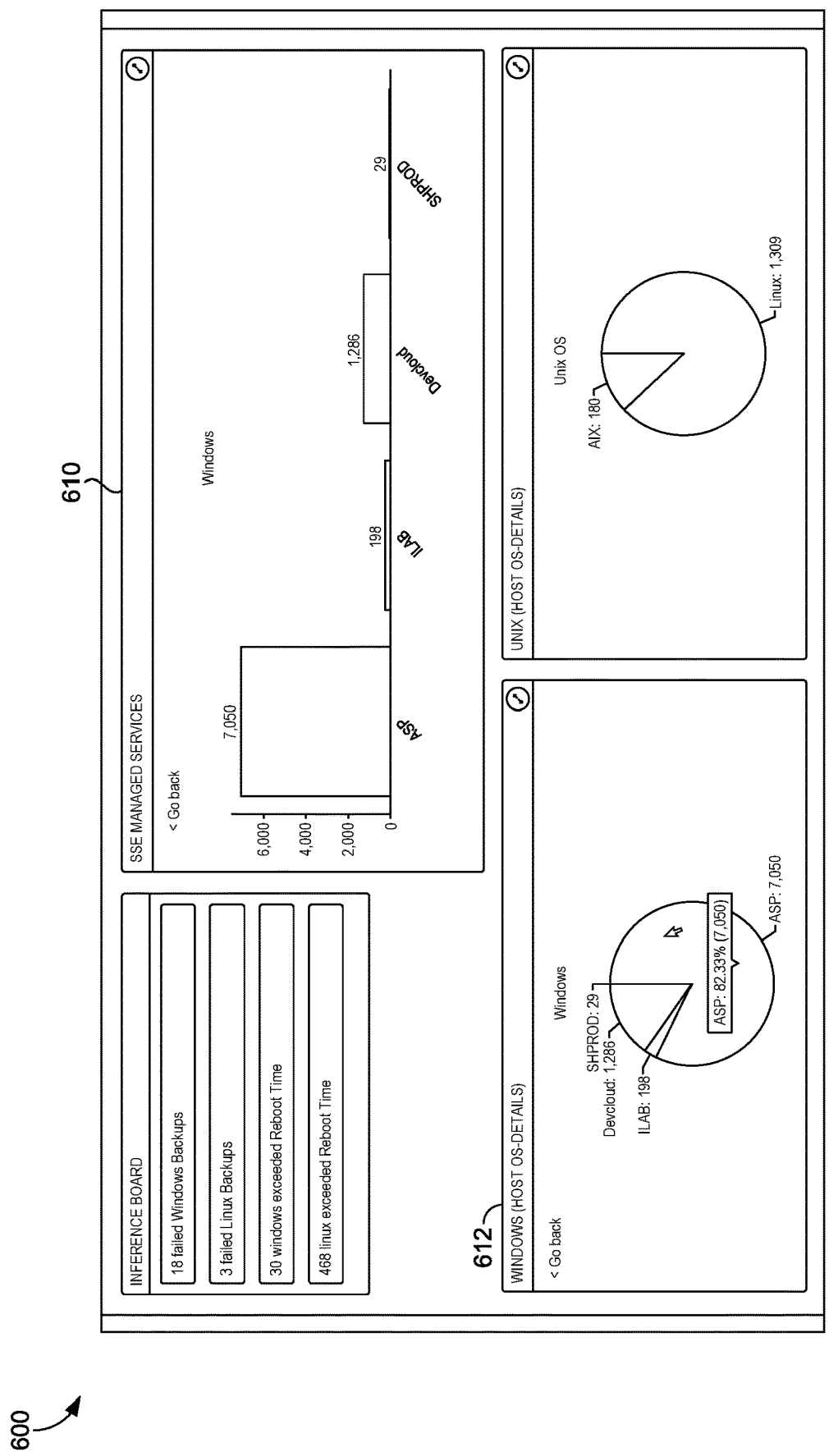

In FIG. 6, a server infrastructure interface 600 provides details of the server infrastructure inventory for the datacenter based on operating system and the environment within the datacenter. In this example, the number and percentage of Windows hosts 610, 612 are broken down into the environment they are located within the datacenter. As shown, there are 7,050 Windows hosts in ASP, 29 Windows hosts in SHPROD, 1,286 Windows hosts in Devcloud, and 198 Windows hosts in ILAB.

Figure 7:
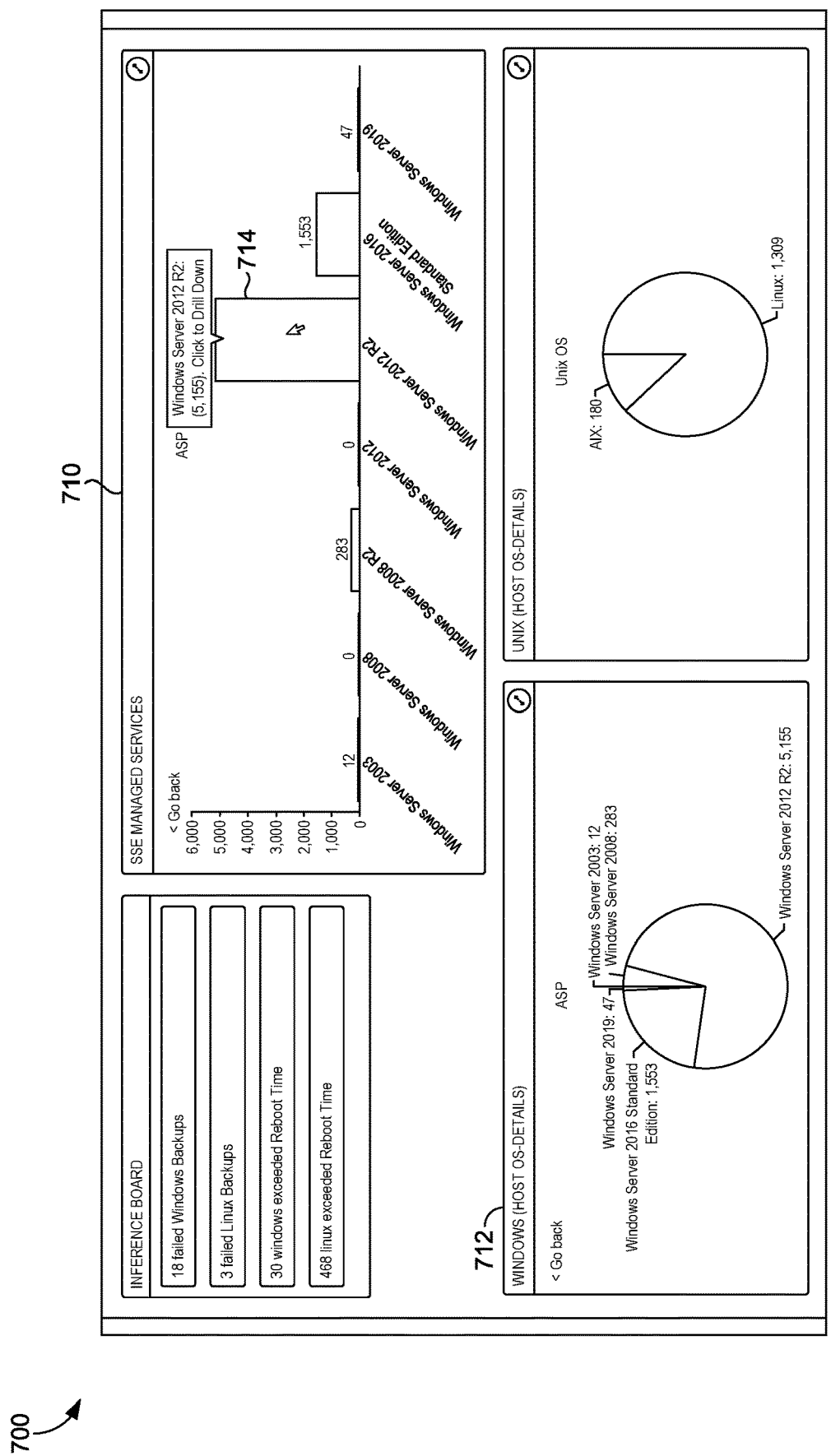

Referring next to FIG. 7, a server infrastructure interface 700 provides additional details of the server infrastructure inventory for the datacenter based on a selected environment within the datacenter. In this example, a user has drilled down into details corresponding to Windows hosts in the ASP environment. As shown, the details provide version and patch details 710, 712 corresponding to the Windows hosts for the ASP environment. Additional details can be provided by selecting a particular version and patch level 714.

Figure 8:

As illustrated in FIG. 8, a user has selected the particular versions and patch level 714 in FIG. 7. In this example, a user has selected Windows Server 2012 R2. In response, a list of server details corresponding to the selection is provided in interface 800.

Figure 9:
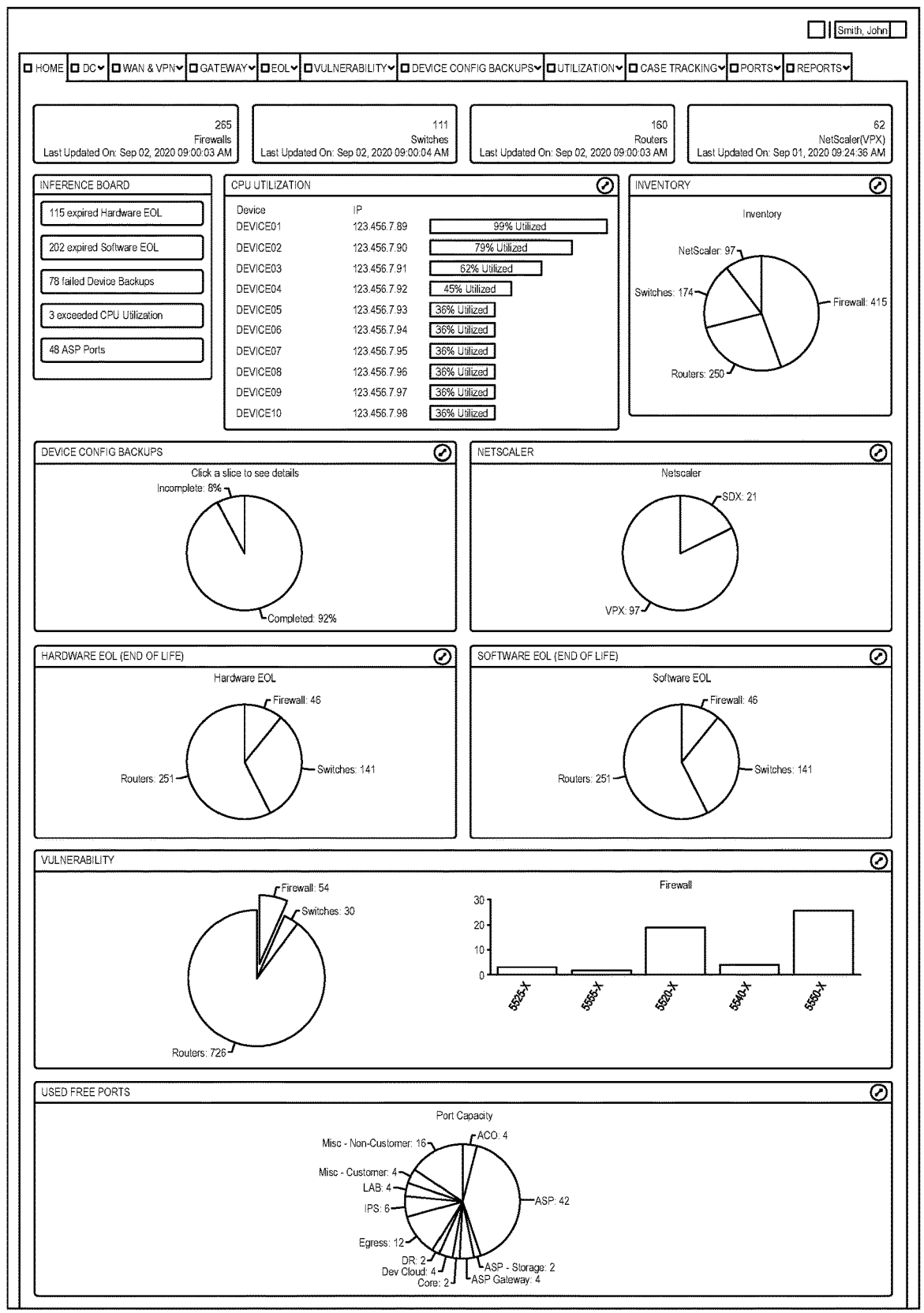
Figure 10:
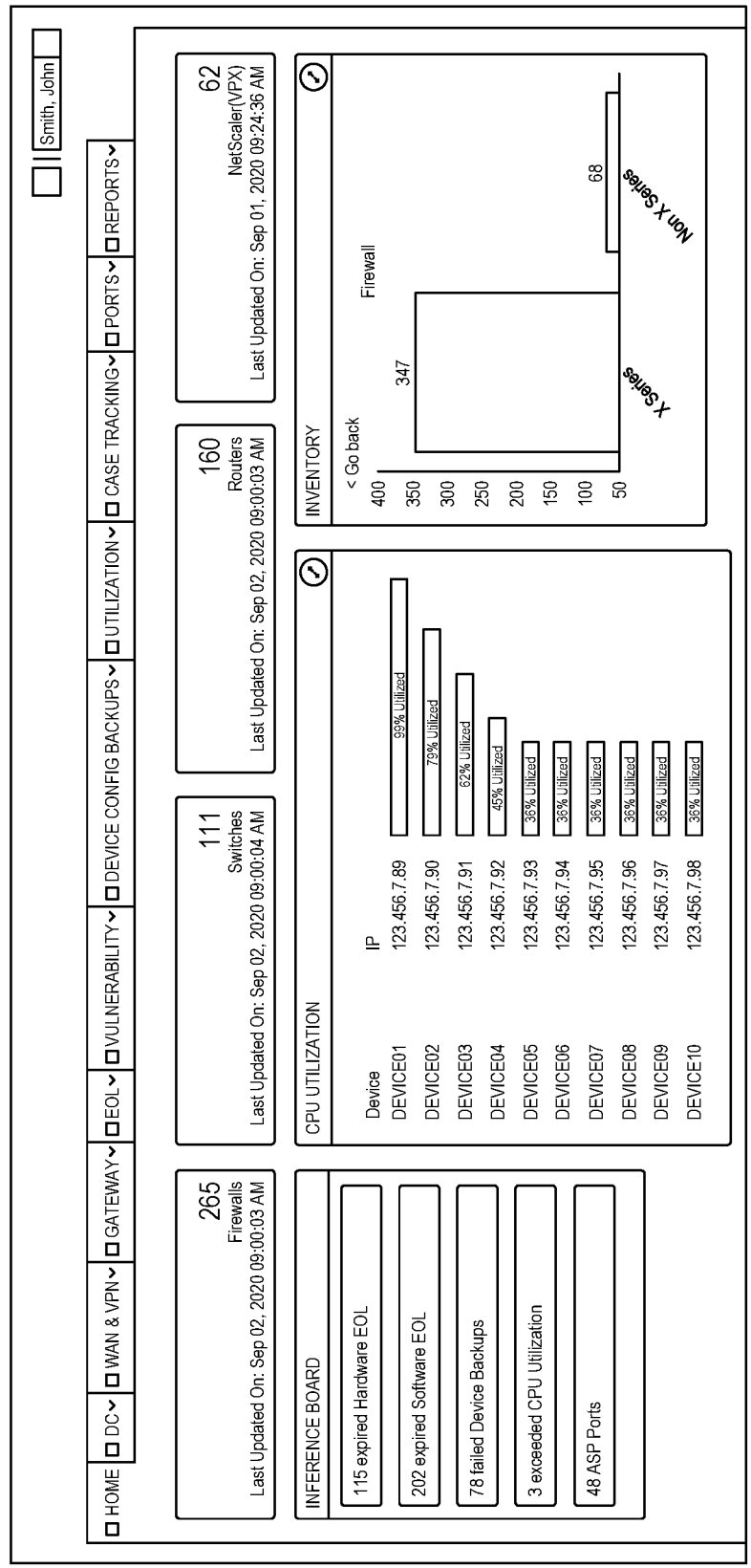
Figure 11:
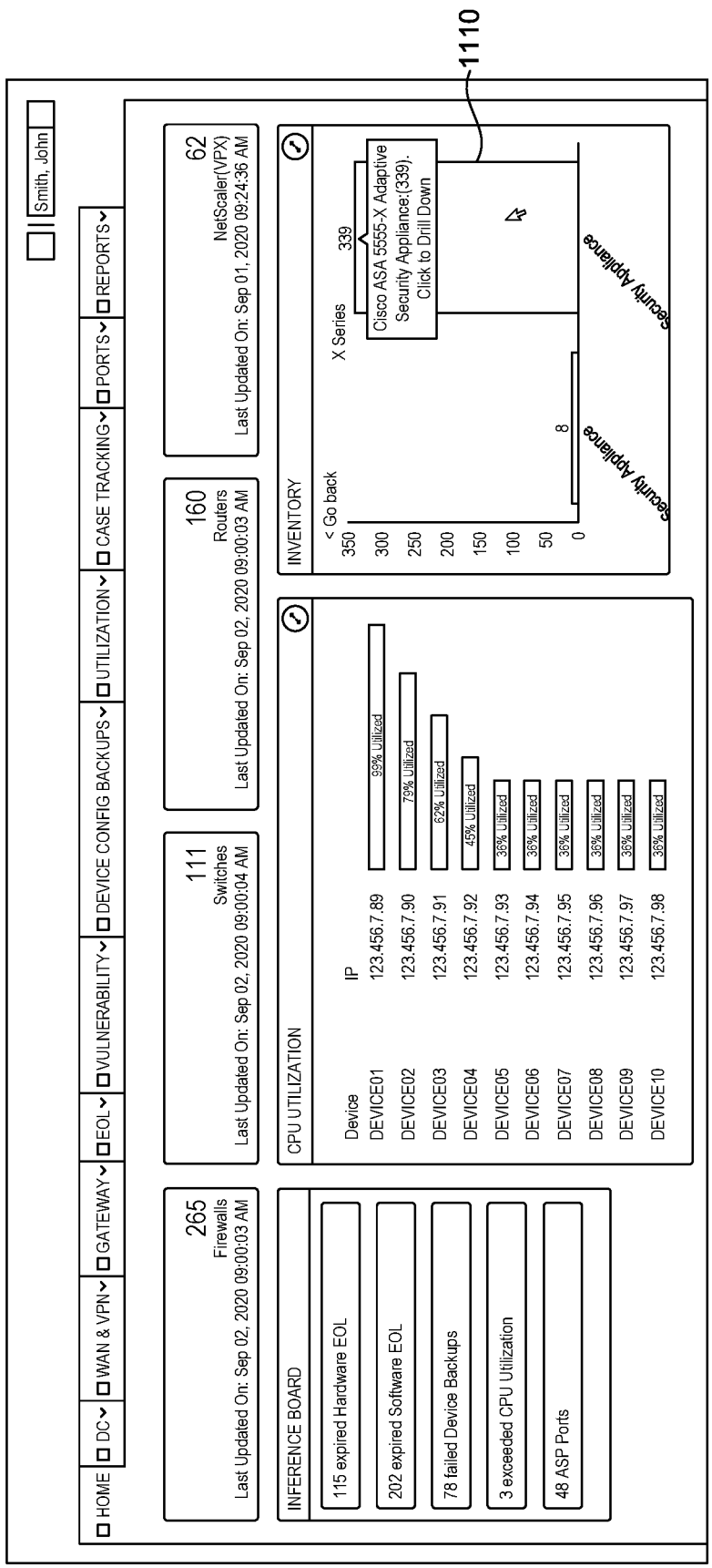

Turning now to FIG. 9, a network inventory interface 900 provides details of the network inventory for the datacenter. In particular, and referring now to FIG. 10, network inventory interface 1000 may include details at the datacenter comprising different categories of network devices such as routers, switches, firewalls, and the like. For example, in FIG. 11, a user may want details for a particular firewall within the inventory. In this case, the user may select the particular firewall 1110 from the interface to drill down for additional details. As a result, a list of details corresponding to the selection is provided in interface 1200 of FIG. 12.

Figure 13:
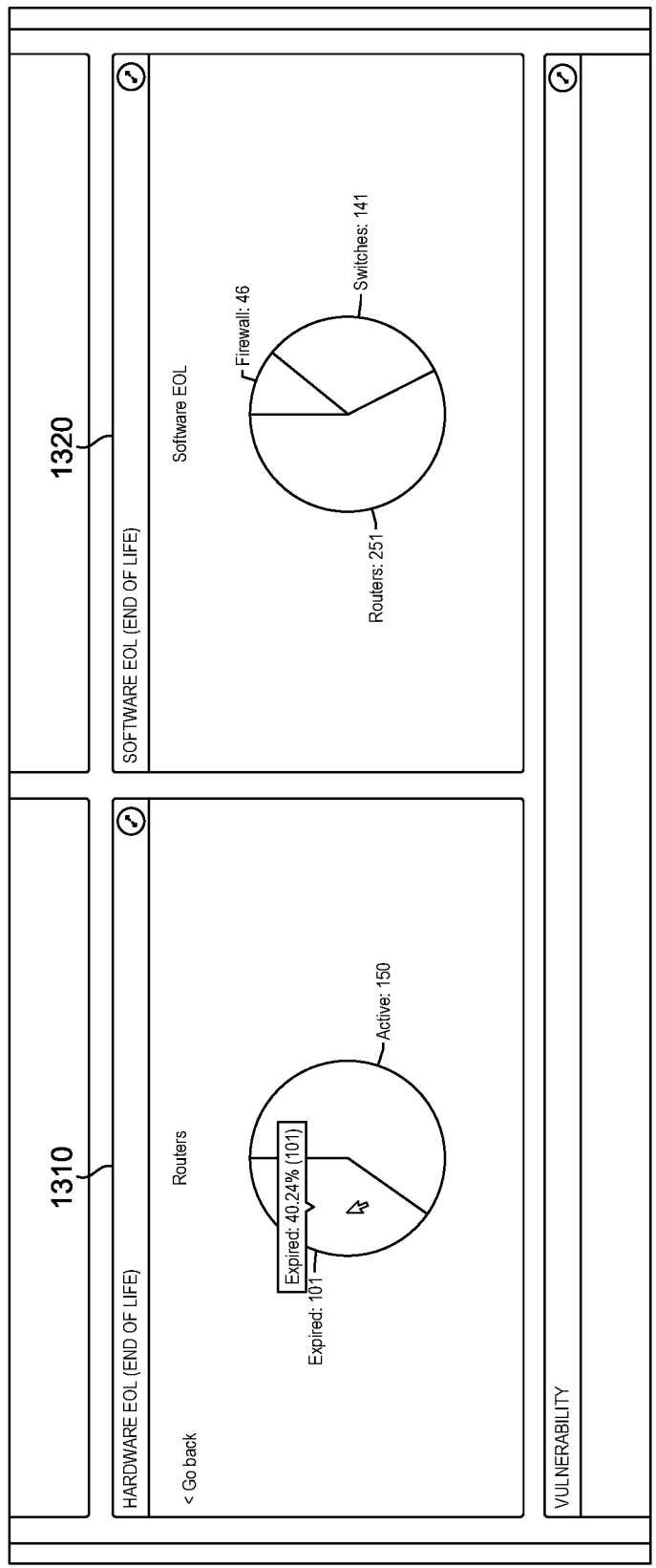

Next, a user may wish to investigate end of life information for the datacenter, as shown in FIG. 13. An end of life interface 1300 may comprise end of life information for the network hardware 1310 and network software 1320 components. Selection of a particular hardware or software component from the end of life interface 1300 provides a list of details corresponding to the selection, as shown in interface 1400 of FIG. 14.

Figure 15:
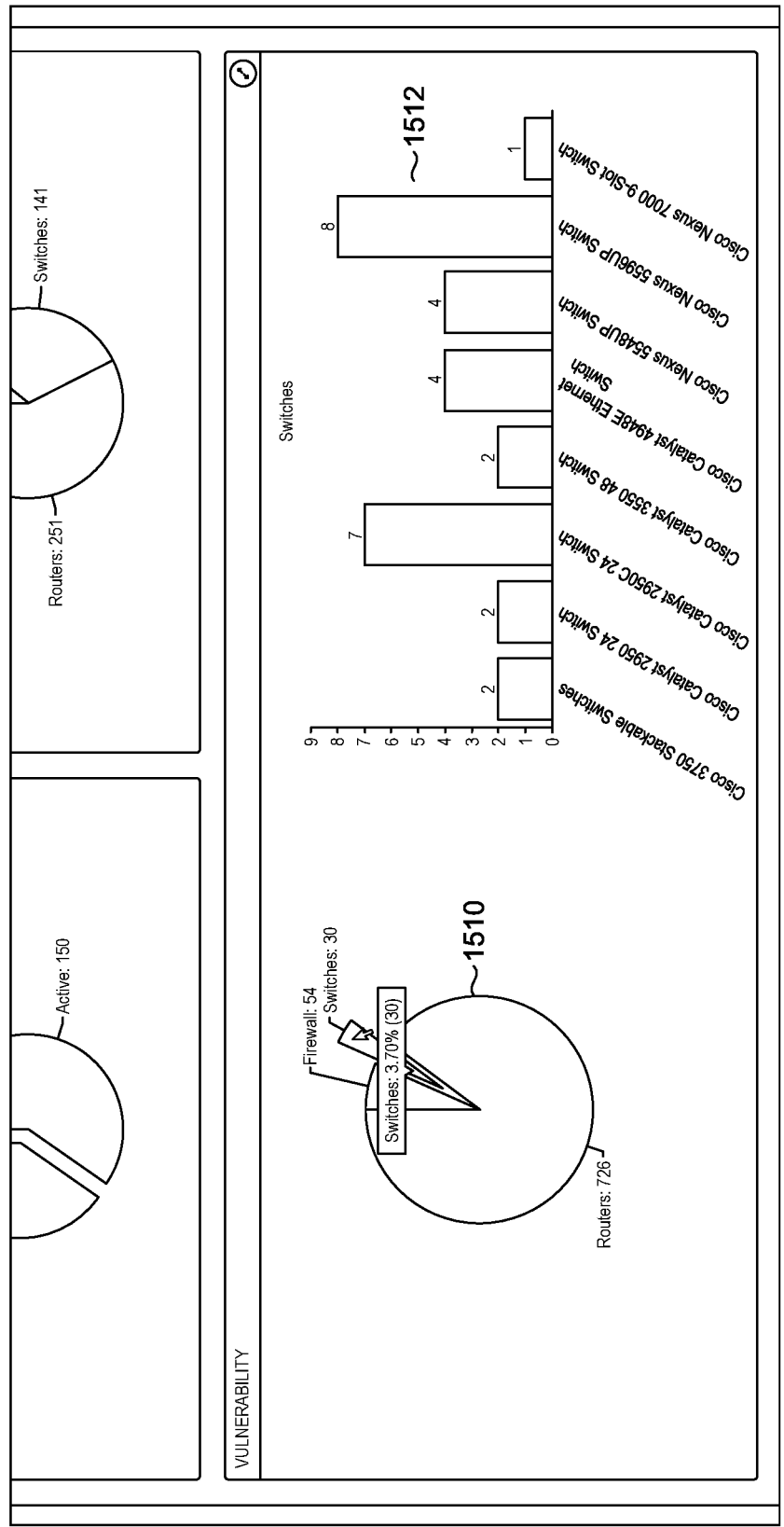

Turning now to FIG. 15, a vulnerabilities interface 1500 is provided. In the vulnerabilities interface 1500, a graphical representation of a number of vulnerabilities for network devices broken down by network device type 1510 is illustrated. As shown, there are 726 vulnerable routers, 54 vulnerable firewalls, and 30 vulnerable switches. Upon selection of a particular network device, additional details 1512 such as vulnerabilities corresponding to switch model may be provided. Selection of a particular network device model from vulnerabilities interface 1500 provides a list of details corresponding to the selection, as shown in interface 1600 of FIG. 16.

Figure 17:
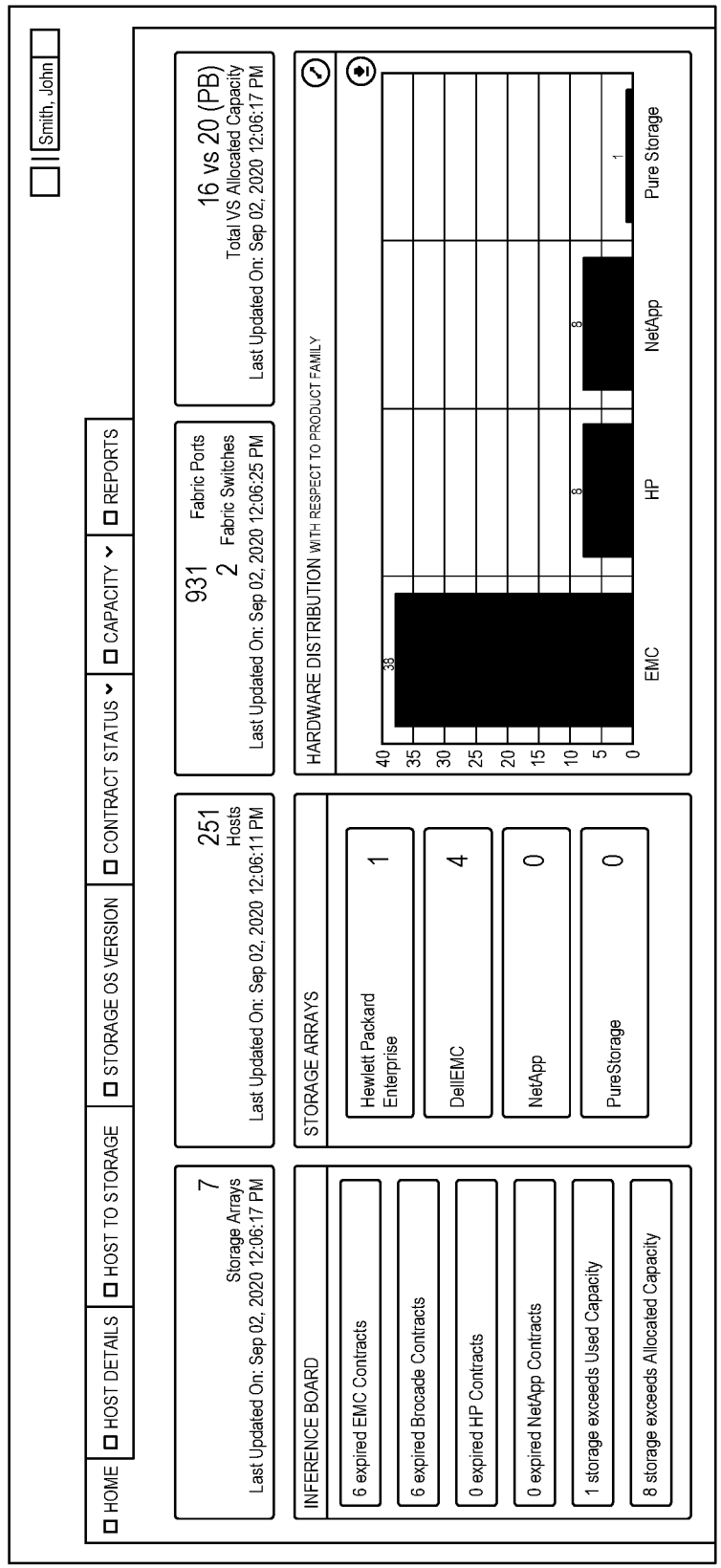
Figure 18:
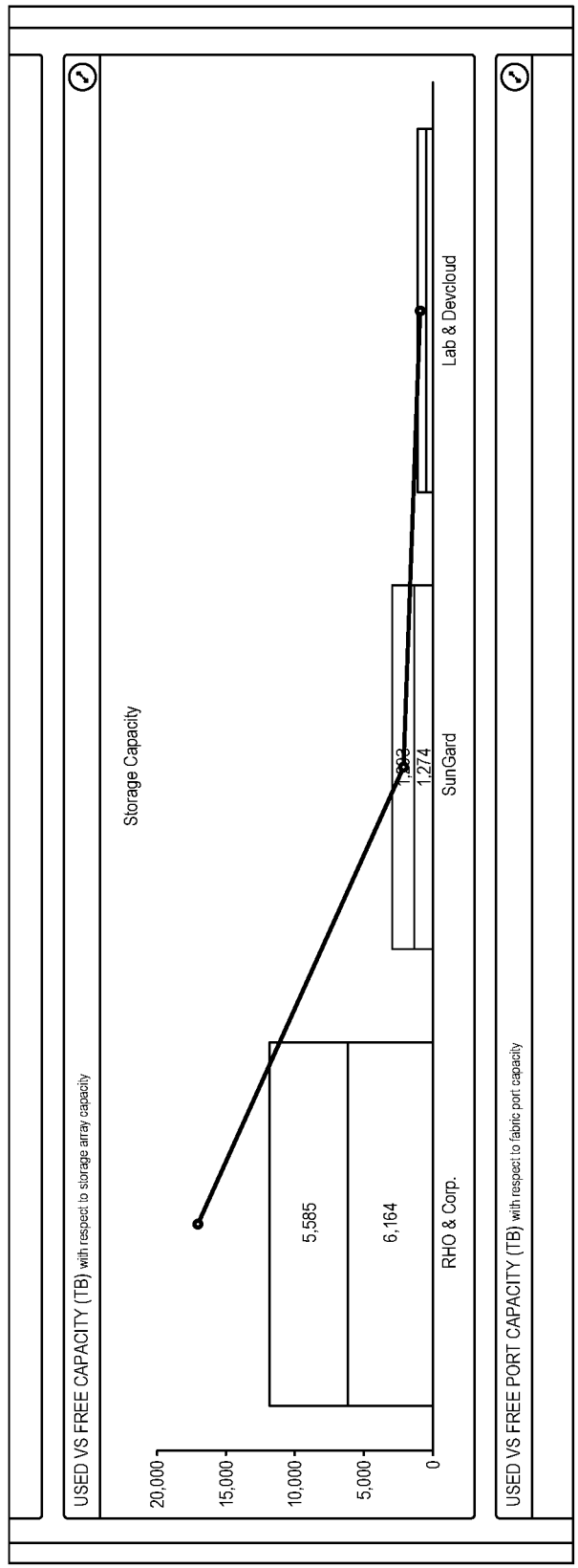
Figure 19:
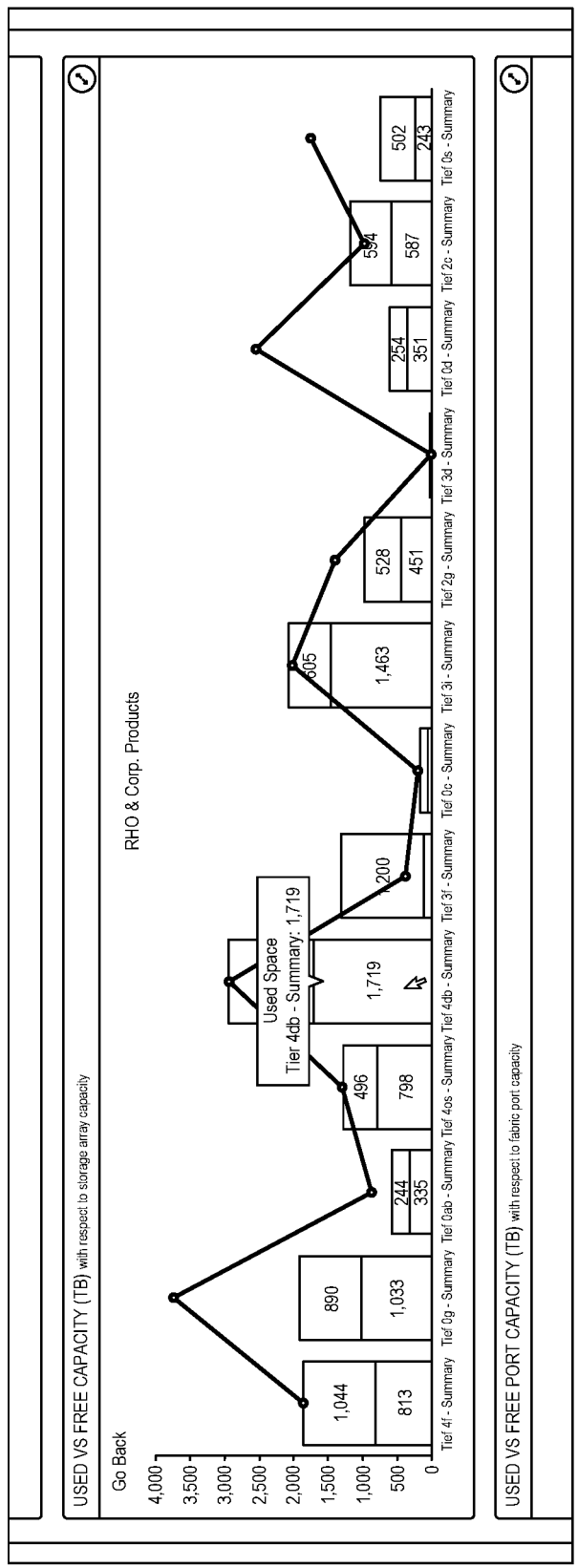
Figure 20:
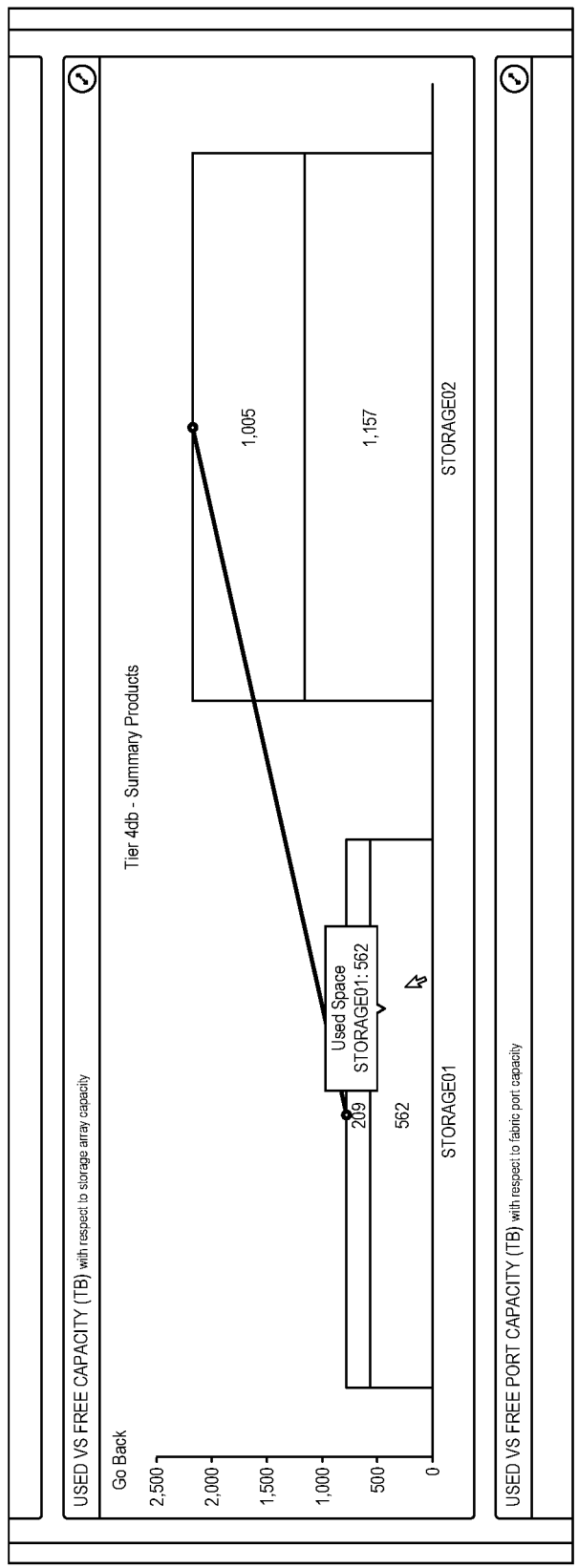

In FIG. 17, a storage array interface 1700 provides an overview of the storage information for the datacenter. Turning to FIG. 18, a storage capacity interface 1800 provides an overview of the storage capacity for the datacenter. Drilling down into a particular storage product, as shown in FIG. 19, provides a storage capacity interface 1900 illustrating the storage capacity for the particular storage product for multiple environments in the datacenter. Drilling down even further into a particular tier within the environment, as shown in FIG. 20, provides a storage capacity interface 2000 illustrating the storage capacity for the particular storage product within the particular tier of the environment. Selection of a particular storage name for the particular storage product within the particular tier of the environment from storage capacity interface 2000 provides details corresponding to the storage array capacity for the selection, as shown in interface 2100 of FIG. 21.

Figure 22:
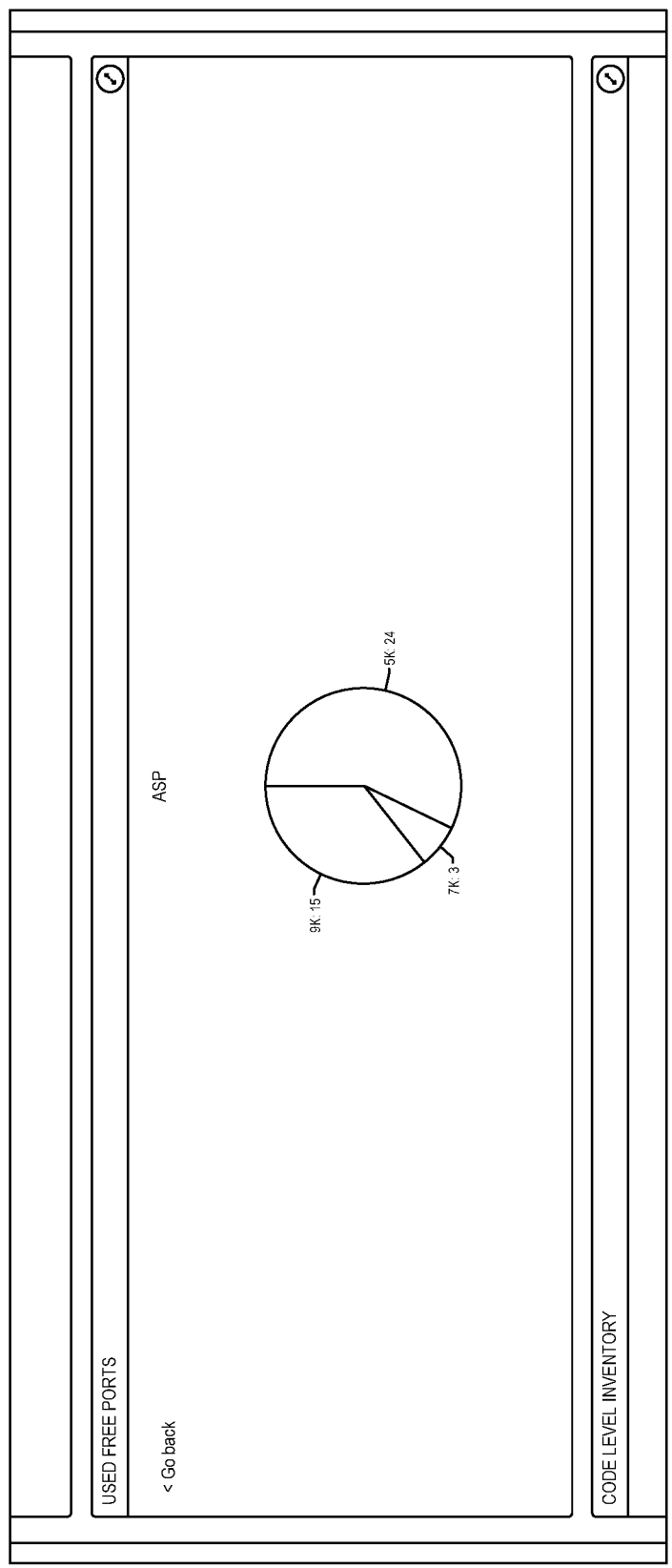
Figure 23:
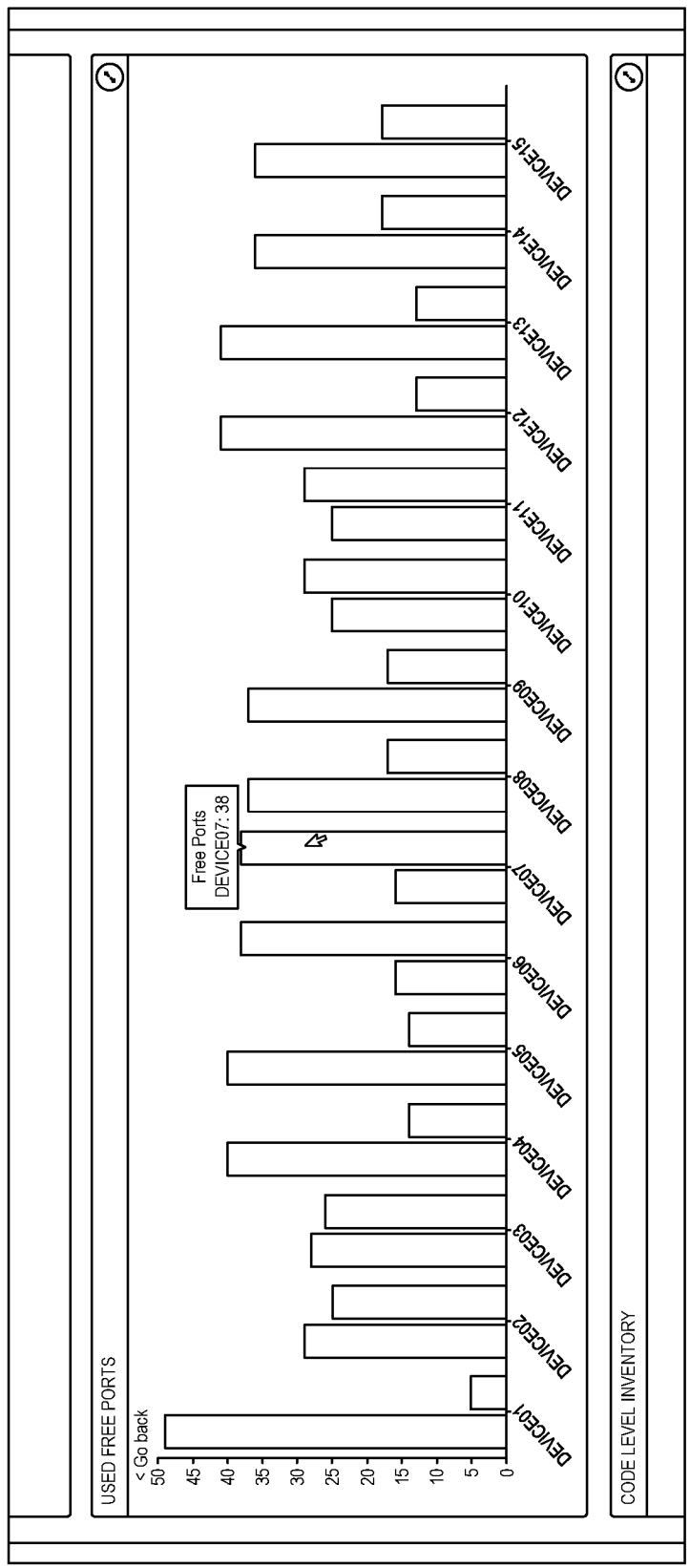

Referring to FIG. 22, a network port capacity interface 2200 provides the network port capacity based on environment. For example, in FIG. 22, the network port capacity for the ASP environment is illustrated. Drilling down further, as shown in FIG. 23, network port capacity interface 2300 provides switch port capacity by the individual switches. Additionally, network port capacity interface 2300 highlights the number of ports used versus ports free per switch. A detailed view based on switch name and port speeds is provided in interface 2400 of FIG. 24.

Figure 25:
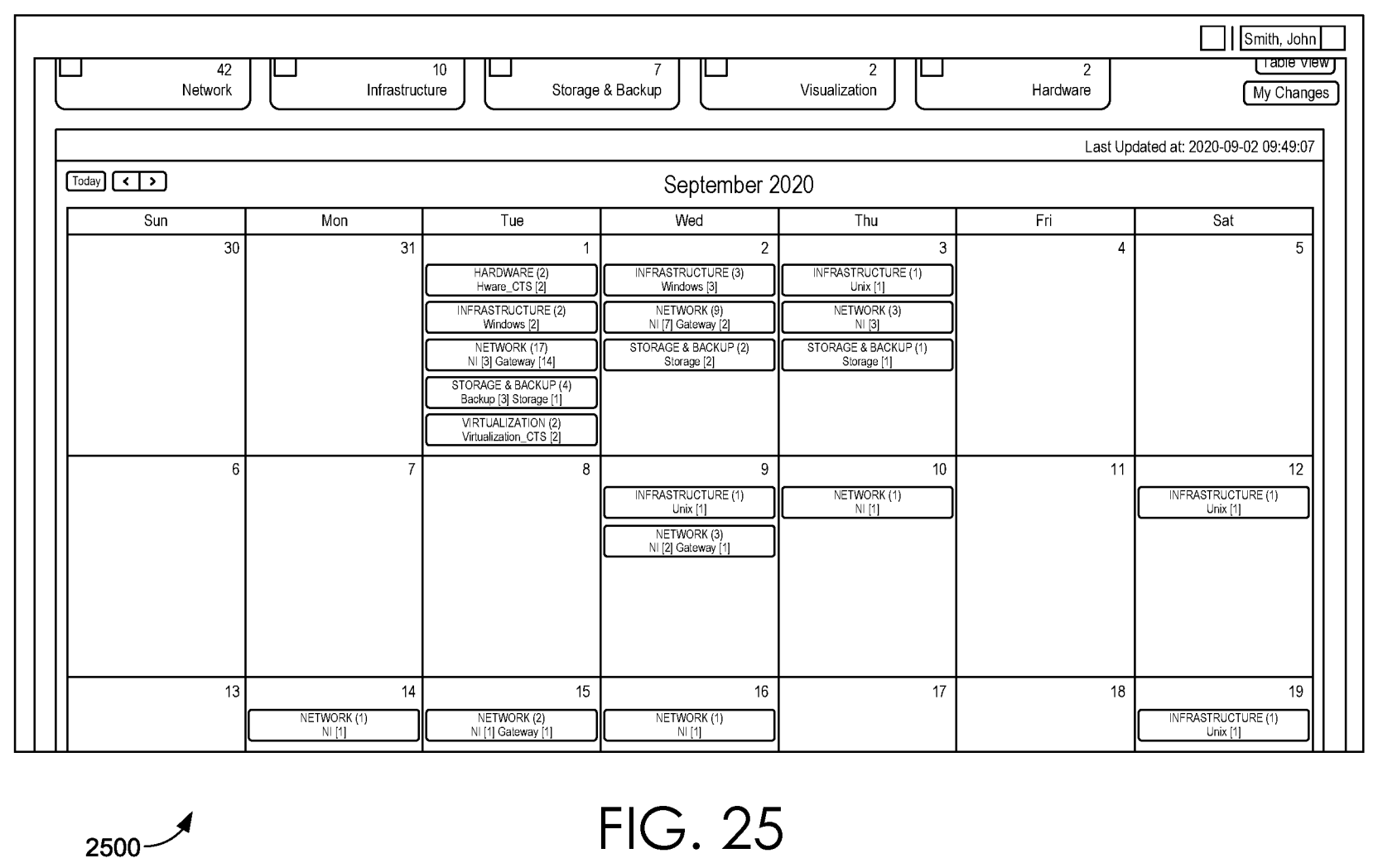
Figure 26:
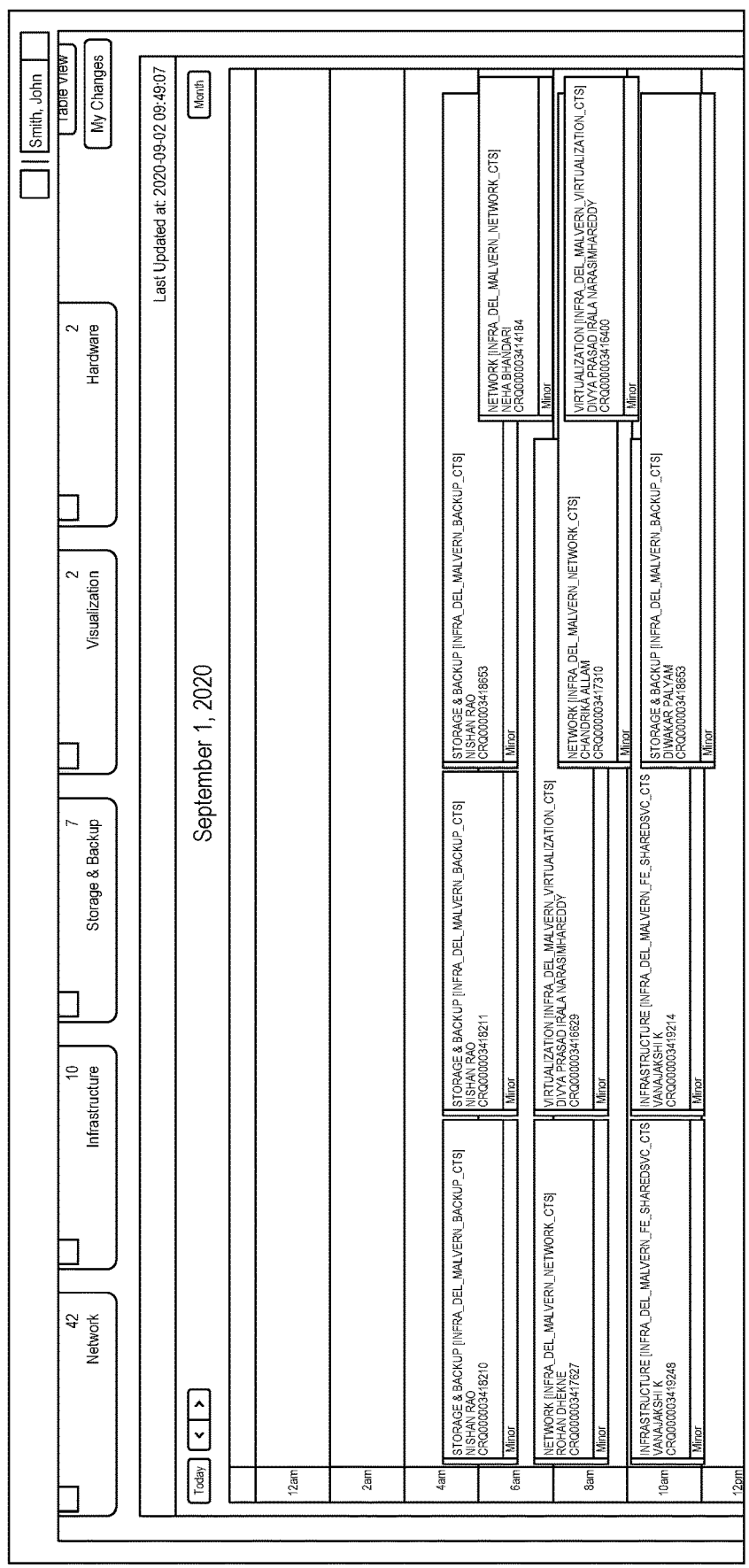
Figure 27:
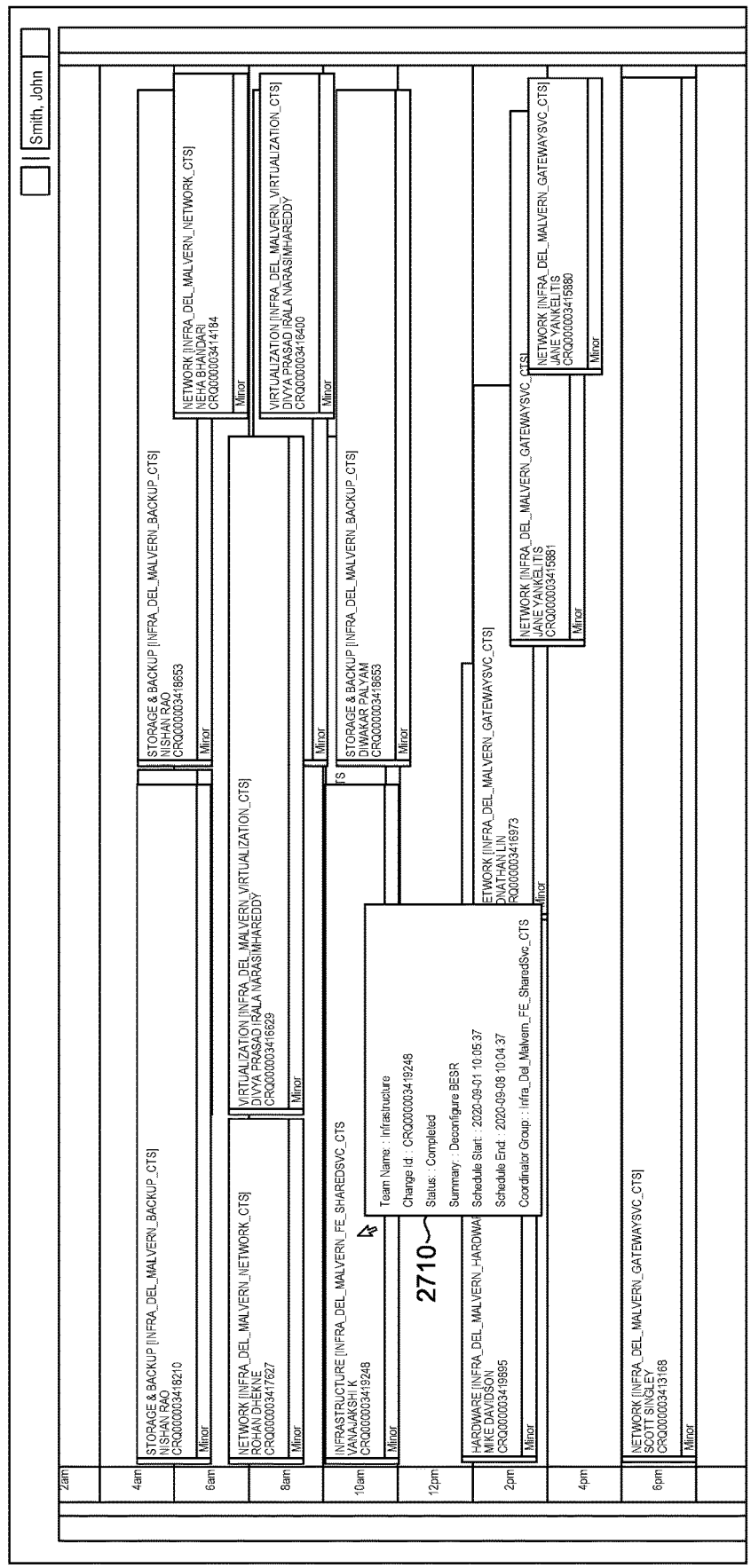
Figure 30:
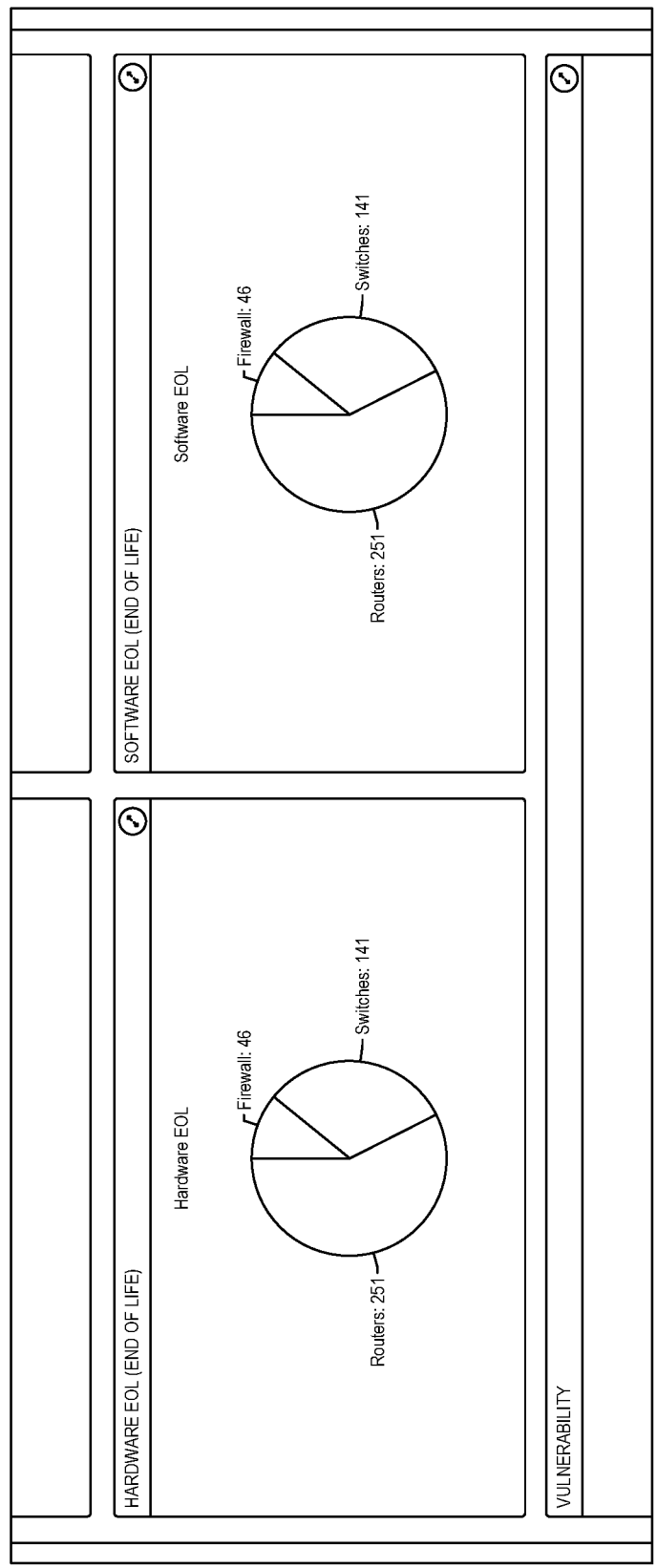

Next, in FIG. 25, a monthly change calendar interface 2500 provides a change calendar for components of the datacenter in a monthly view. As shown, the monthly change calendar interface 2500 lists scheduled changes for the chosen month across all technologies and teams supported by the datacenter. Selection of a particular day within the monthly change calendar interface 2500 transitions the display to a daily change calendar interface 2600, as shown in FIG. 26. The daily change calendar interface 2600 provides scheduled changes for the chosen day across all technologies and teams supported by the datacenter. Hovering over or otherwise interacting with a particular change within the monthly change calendar interface 2500 or the daily change calendar interface 2600 reveals change details 2710, as shown in interface 2700 of FIG. 27. Change details may include team name, change identification, status, summary, scheduled start, scheduled end, and coordinator group. In both the monthly change calendar interface 2500 and the daily change calendar interface 2600, multiple filters provide a user the capability to search for specific scheduled changes. For example, the user can search the calendar for changes assigned to a particular team, changes in a particular queue, changes by impact, change status, changes by component type, or a date range for changes.

Turning now to FIG. 28, an asset interface 2800 provides an interface enabling a user to readily ascertain information corresponding to a particular asset, information corresponding to assets within a particular environment, or the like. For example, if the user were scheduling a change for a particular environment, the user could readily identify all assets within that environment.

In FIG. 29, a storage and backup interface 2900 is provided. The storage and backup interface 2900 illustrates various information regarding monthly storage and backups. For example, the storage and backup interface 2900 may provide change identification, group name, schedule start, schedule end, summary, status, coordinator group, impact, and coordinator name for the monthly storage and backups.

Figure 31:
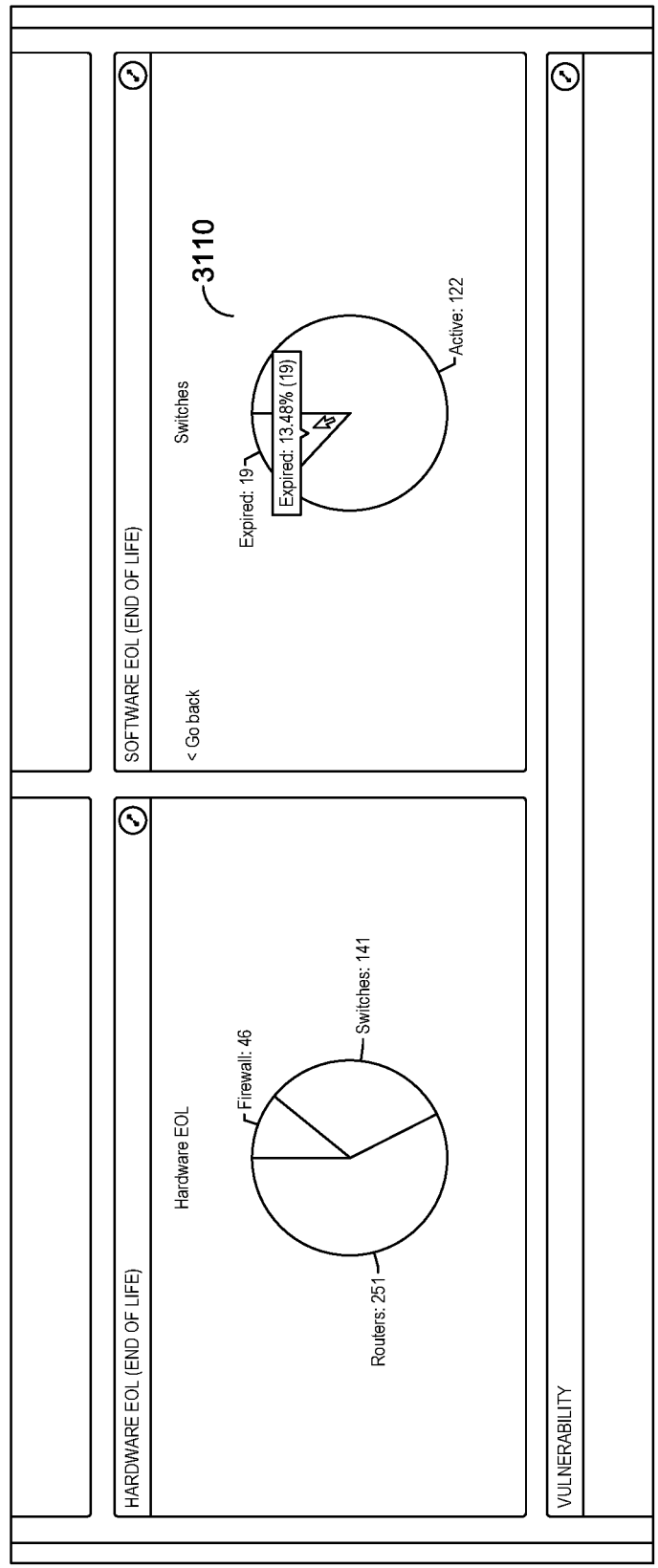

Referring again to end of life information for the datacenter, an end of life interface is illustrated in FIG. 31. In this example, a user has selected switches 3110 from the end of life interface 3100. In response, the end of life interface 3100 indicates the number of active and expired switches. Drilling down further into a particular switch, as shown in FIG. 32, provides an end of life asset interface 3200. As illustrated, the end of life asset interface 3200 provides information corresponding to devices that may be affected by the particular switch. Details regarding the end of life are provided by end of life details interface 3300, as shown in FIG. 33.

Figure 34:
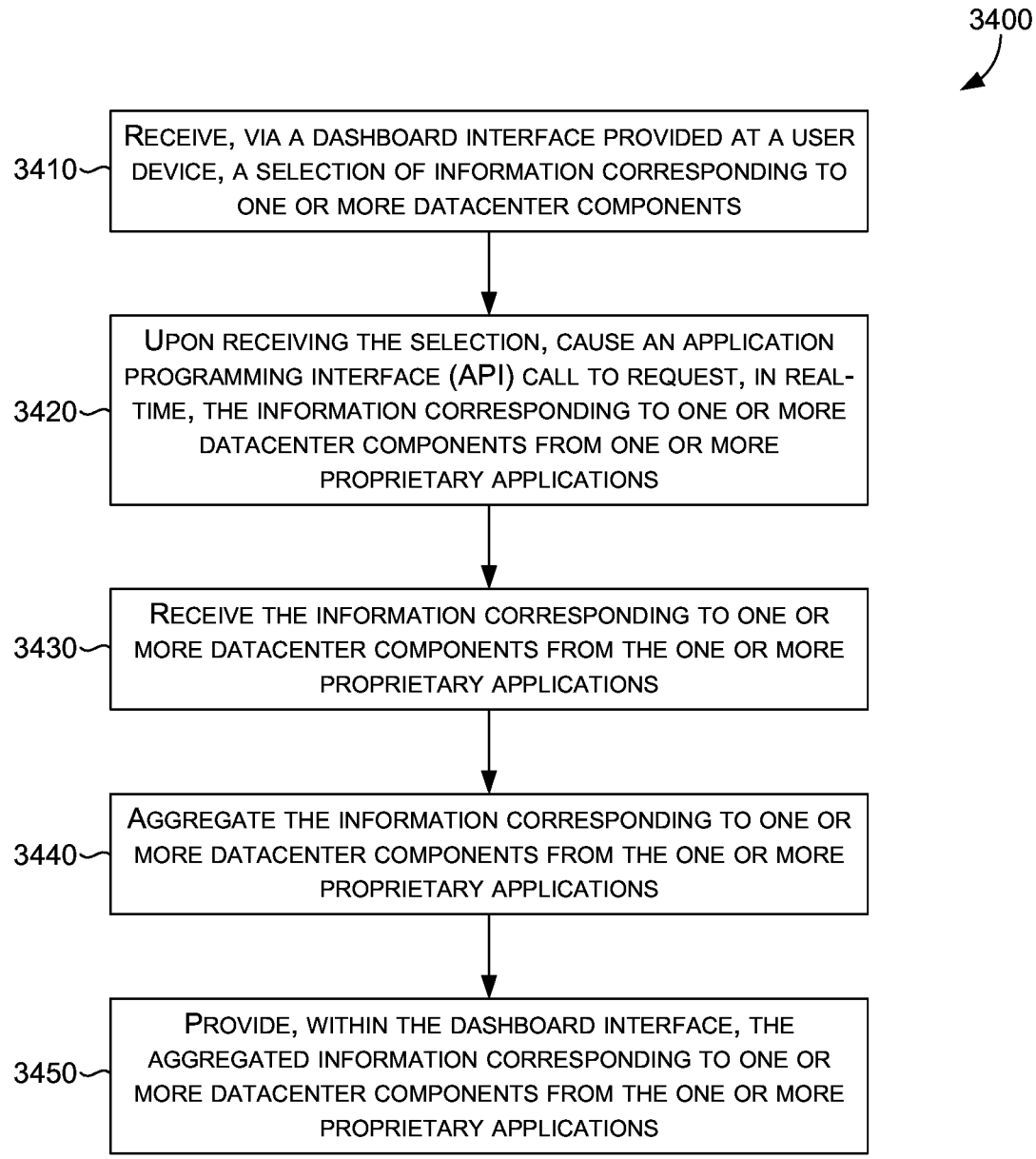
FIG. 34 is a flow diagram showing an exemplary method for providing a dashboard interface, in accordance with various embodiments of the present disclosure.

Referring to FIG. 34, a flow diagram is provided illustrating a method 3400 for providing a dashboard interface, in accordance with various embodiments of the present disclosure, in accordance with various embodiments of the present disclosure. Method 3400 may be performed by any computing device (such as computing device described with respect to FIG. 1) with access to dashboard interface system (such as the one described with respect to FIG. 2) or by one or more components of the dashboard interface system (such as the dashboard interface engine described with respect to FIGS. 2 and 3).

Initially, as shown at step 3410, a selection of information corresponding to one or more datacenter components is received, via a dashboard interface provided at a user device. The information may comprise one or more of: asset information, storage information, network information, virtualization information, systems information, capacity planning information, and change and incident management information.

Upon receiving the selection, as shown at step 3420, an API call is caused to request, in real-time, the information corresponding to one or more datacenter components from one or more proprietary applications. In embodiments, each of the one or more proprietary applications are provided by different entities and store data in different formats. The API call may translate the selection of information into proprietary business logic corresponding to a proprietary application of the one or more proprietary applications.

The information corresponding to one or more datacenter components is received, at step 3430, from the one or more proprietary applications.

At step 3440, the information corresponding to one or more datacenter components from the one or more proprietary applications is aggregated. In some embodiments, aggregating the information comprises translating the received information into business logic corresponding to the dashboard interface.

The aggregated information corresponding to one or more datacenter components from the one or more proprietary applications is provided, within the dashboard interface, at step 3450. In some embodiments, a change calendar that comprises one or more links to a proprietary application of the one or more proprietary applications for additional information is provided within the dashboard interface. In some embodiments, a unified central repository that provides capacity information across all infrastructure verticals for the one or more datacenter components is provided within the dashboard interface. In some embodiments, a unified central repository that provides a detailed inventory for the one or more datacenter components is provided within the dashboard interface. The unified central repository may provide environment-wise and vendor-wise data for the one or more datacenter components.

Additionally or alternatively, the unified central repository, enables tracking of vendor contracts for the one or more datacenter components. For example, end of life and end of service life devices of the one or more datacenter components may be identified. Clients affected by the end of life and end of service life devices of the one or more datacenter components may be identified. Upgrade activity for the end of life and end of service life devices of the one or more datacenter components may be automatically scheduled based on downtime preferences of the identified clients.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

We claim:

1. A method comprising:
 receiving, via a dashboard interface provided at a user device, a selection of information corresponding to one or more datacenter components;
 upon receiving the selection, causing an application programming interface (API) call to request, in real-time, the information corresponding to one or more datacenter components from one or more proprietary applications;
 wherein the API call translates the selection of information into proprietary business logic corresponding to the one or more proprietary applications that is called by the API call;
 receiving, in response to the API call, the information corresponding to the one or more datacenter components from the one or more proprietary applications;
 aggregating the information received corresponding to the one or more datacenter components from the one or more proprietary applications;
 providing, within the dashboard interface, the aggregated information corresponding to the one or more datacenter components from the one or more proprietary applications;
 providing, within the dashboard interface, a unified central repository that provides a detailed inventory for the one or more datacenter components; and
 enabling, by the unified central repository, tracking of vendor contracts for the one or more datacenter components, wherein enabling tracking of vendor contracts for the one or more datacenter components further comprises:
  identifying end of life devices and end of service life devices of the one or more datacenter components based at least on the vendor contracts;

identifying clients affected by the identified end of life devices or the end of service life devices of the one or more datacenter components; and automatically scheduling upgrade activity for the devices of the one or more datacenter components based on downtime preferences of the identified clients.

2. The method of claim 1, wherein each of the one or more proprietary applications are provided by different entities and store data in different formats.

3. The method of claim 1, wherein the information comprises one or more of: asset information, storage information, network information, virtualization information, systems information, capacity planning information, and change and incident management information.

4. The method of claim 1, wherein aggregating the information comprises translating the received information into business logic corresponding to the dashboard interface.

5. The method of claim 1, further comprising providing, within the dashboard interface, a change calendar that comprises one or more links to a proprietary application of the one or more proprietary applications for additional information.

6. The method of claim 1, further comprising, providing, within the dashboard interface, the unified central repository that provides capacity information across a plurality of infrastructure verticals for the one or more datacenter components.

7. The method of claim 1, further comprising, providing, by the unified central repository, environment-wise and vendor-wise data for the one or more datacenter components.

8. One or more computer storage media having computer-executable instructions embodied thereon that, when executed by a computer, causes the computer to perform operations comprising:

receiving, via a dashboard interface provided at a user device, a selection of information corresponding to one or more datacenter components, the information comprising one or more of: asset information, storage information, network information, virtualization information, systems information, capacity planning information, and change and incident management information;

upon receiving the selection, causing an application programming interface (API) call to request, in real-time, the information corresponding to one or more datacenter components from one or more proprietary applications, wherein each of the one or more proprietary applications are provided by different entities and store data in different formats;

wherein the API call translates the selection of information into a call format corresponding to the one or more proprietary applications that is called by the API call;

receiving, in response to the API call, the information corresponding to one or more datacenter components from the one or more proprietary applications;

aggregating the information received corresponding to the one or more datacenter components from the one or more proprietary applications;

providing the information, within the dashboard interface, the aggregated information corresponding to one or more datacenter components from the one or more proprietary applications;

providing, within the dashboard interface, a unified central repository that provides a detailed inventory for the one or more datacenter components; and enabling, by the unified central repository, tracking of vendor contracts for the one or more datacenter components, wherein enabling tracking of vendor contracts for the one or more datacenter components further comprises:

identifying end of life and end of service life devices of the one or more datacenter components;

identifying clients affected by devices of the one or more datacenter components; and automatically scheduling upgrade activity for the devices of the one or more datacenter components based on downtime preferences of the identified clients.

9. The media of claim 8, wherein causing the API call to request the information comprises translating the selection of information into proprietary business logic corresponding to a proprietary application of the one or more proprietary applications to communicate with the proprietary application.

10. The media of claim 8, wherein aggregating the information comprises translating the received information into business logic corresponding to the dashboard interface.

11. The media of claim 8, further comprising providing, within the dashboard interface, a change calendar that comprises one or more links to a proprietary application of the one or more proprietary applications for additional information.

12. The media of claim 8, further comprising, providing, within the dashboard interface, the unified central repository that provides capacity information across a plurality of infrastructure verticals for the one or more datacenter components.

13. A system comprising:
one or more processors; and
a non-transitory computer storage media storing computer-useable instructions that, when used by the one or more processors, cause the one or more processors to:

receive, via a dashboard interface provided at a user device, a selection of information corresponding to one or more datacenter components;

upon receiving the selection, cause an application programming interface (API) call to request, in real-time, the information corresponding to one or more datacenter components from one or more proprietary applications;

wherein the API call translates the selection of information into a call format corresponding to the one or more proprietary applications that is called by the API call;

receiving, in response to the API call, the information corresponding to one or more datacenter components from the one or more proprietary applications;

aggregate the information received corresponding to the one or more datacenter components from the one or more proprietary applications;

provide the information, within the dashboard interface, the aggregated information corresponding to the one or more datacenter components from the one or more proprietary applications;

provide, within the dashboard interface, a unified central repository that provides a detailed inventory for the one or more datacenter components; and enable, by the unified central repository, tracking of vendor contracts for the one or more datacenter components, wherein enabling tracking of vendor contracts for the one or more datacenter components further comprises:

identifying end of life devices and end of service life devices of the one or more datacenter components based at least on the vendor contracts;

identifying clients affected by the identified end of life devices or the end of service life devices of the one or more datacenter components; and automatically scheduling upgrade activity for the devices of the one or more datacenter components based on downtime preferences of the identified clients.

\* \* \* \* \*